United States Patent
Bergström

(10) Patent No.: US 9,820,324 B2
(45) Date of Patent: Nov. 14, 2017

(54) NETWORK CONTROL OF TERMINALS WITH RESPECT TO MULTIPLE RADIO ACCESS NETWORKS

(71) Applicant: Telefonaktiebolaget L M Ericsson (publ), Stockholm (SE)

(72) Inventor: Mattias Bergström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 16 days.

(21) Appl. No.: 14/781,148

(22) PCT Filed: Jan. 14, 2014

(86) PCT No.: PCT/SE2014/050034
§ 371 (c)(1),
(2) Date: Sep. 29, 2015

(87) PCT Pub. No.: WO2014/163549
PCT Pub. Date: Oct. 9, 2014

(65) Prior Publication Data
US 2016/0050709 A1    Feb. 18, 2016

Related U.S. Application Data

(60) Provisional application No. 61/808,341, filed on Apr. 4, 2013, provisional application No. 61/807,993, filed on Apr. 3, 2013.

(51) Int. Cl.
*H04W 76/02* (2009.01)
*H04W 36/00* (2009.01)
(Continued)

(52) U.S. Cl.
CPC ..... *H04W 76/026* (2013.01); *H04W 36/0066* (2013.01); *H04W 36/24* (2013.01);
(Continued)

(58) Field of Classification Search
CPC ........... H04W 76/026; H04W 36/0066; H04W 88/06; H04W 48/08; H04W 36/24; H04W 84/12
See application file for complete search history.

(56) References Cited

U.S. PATENT DOCUMENTS 9,374,768 B2 * 6/2016 Wang .................... H04W 48/12
2008/0293419 A1 * 11/2008 Somasundaram  H04M 15/7657
                                                                              455/437

(Continued)

FOREIGN PATENT DOCUMENTS

EP      2282578 A1   2/2011
WO   2009021009 A1   2/2009

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.3.0, Sep. 2012, 1-205.

(Continued)

*Primary Examiner* — Nathan Mitchell
(74) *Attorney, Agent, or Firm* — Murphy, Bilak & Homiller, PLLC

(57) ABSTRACT

There is provided a method, in a terminal, for handling connections to two radio access networks, the method comprising receiving (601), from a first radio access network, one or more threshold values and/or conditions for use in determining how the terminal should handle connections to a second radio access network, wherein the one or more threshold values and/or conditions are received in a message field used to carry threshold values and wherein at least one of the threshold values and/or conditions corresponds to a reserved value and/or condition that indicates an action for the terminal to take with respect to the second radio access (Continued)

network; and carrying out one or more actions with respect to the second radio access network, based on the received one or more threshold values and/or conditions (603).

13 Claims, 15 Drawing Sheets

(51) Int. Cl.
*H04W 84/12* (2009.01)
*H04W 36/24* (2009.01)
*H04W 88/06* (2009.01)
*H04W 48/08* (2009.01)

(52) U.S. Cl.
CPC ............ *H04W 48/08* (2013.01); *H04W 84/12* (2013.01); *H04W 88/06* (2013.01)

(56) References Cited

U.S. PATENT DOCUMENTS

| | | | |
|---|---|---|---|
| 2009/0088160 A1* | 4/2009 | Pani | H04W 36/30 455/436 |
| 2010/0323698 A1 | 12/2010 | Rune et al. | |
| 2011/0002295 A1* | 1/2011 | Ghosal | H04W 36/0055 370/331 |
| 2011/0142006 A1 | 6/2011 | Sachs et al. | |
| 2014/0146794 A1* | 5/2014 | Dalsgaard | H04W 8/02 370/332 |
| 2014/0153511 A1* | 6/2014 | Sirotkin | H04W 48/06 370/329 |
| 2014/0233386 A1* | 8/2014 | Jamadagni | |
| 2015/0189557 A1* | 7/2015 | Touati | H04W 36/0066 370/332 |

OTHER PUBLICATIONS

Aboba, B. et al., "Extensible Authentication Protocol (EAP)", Network Working Group, Request for Comments: 3748, The Internet Society, Jun. 2004, 1-43.

Aboba, B. et al., "Extensible Authentication Protocol (EAP) Key Management Framework", Network Working Group, Request for Comments: 5247, The Internet Society, Aug. 2008, 1-50.

Rigney, C. et al., "Remote Authentication Dial in User Service (RADIUS)", Network Working Group, Request for Comments: 2865, Jun. 2000, 1-48.

Unknown, Author, "Analysis of WLAN/3GPP interworking solutions", Ericsson, ST-Ericsson, 3GPP TSG-RAN WG2 #81bis, Tdoc R2-13xxxx, Chicago, IL, USA, Apr. 15-19, 2013, 1-4.

* cited by examiner

NETWORK CONTROL OF TERMINALS WITH RESPECT TO MULTIPLE RADIO ACCESS NETWORKS

TECHNICAL FIELD

The present disclosure is generally related to wireless devices that support multiple radio access technologies and more particularly relates to the handling of connections to multiple radio access networks in these devices.

BACKGROUND

The wireless local-area network (WLAN) technology known as "Wi-Fi" has been standardized by IEEE in the 802.11 series of specifications (i.e., as "IEEE Standard for Information technology—Telecommunications and information exchange between systems. Local and metropolitan area networks—Specific requirements. Part 11: Wireless LAN Medium Access Control (MAC) and Physical Layer (PHY) Specifications"). As currently specified, Wi-Fi systems are primarily operated in the 2.4 GHz or 5 GHz bands.

The IEEE 802.11 specifications regulate the functions and operations of the Wi-Fi access points or wireless terminals, collectively known as "stations" or "STA," in the IEEE 802.11, including the physical layer protocols, Medium Access Control (MAC) layer protocols, and other aspects needed to secure compatibility and inter-operability between access points and portable terminals. Because Wi-Fi is generally operated in unlicensed bands, communication over Wi-Fi may be subject to interference sources from any number of both known and unknown devices. Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies. Cellular operators that are currently serving mobile users with, for example, any of the technologies standardized by the 3rd-Generation Partnership Project (3GPP), including the radio-access technologies known as Long-Term Evolution (LTE), Universal Mobile Telecommunications System (UMTS)/Wideband Code-Division Multiple Access (WCDMA), High Speed Packet Access (HSPA) and Global System for Mobile Communications (GSM), see Wi-Fi as a wireless technology that can provide good additional support for users in their regular cellular networks.

As used herein, the term "operator-controlled Wi-Fi" indicates a Wi-Fi deployment that on some level is integrated with a cellular network operator's existing network, where the operator's radio access network(s) and one or more Wi-Fi wireless access points may even be connected to the same core network (CN) and provide the same or overlapping services. Currently, several standardization organizations are intensely active in the area of operator-controlled Wi-Fi. In 3GPP, for example, activities to connect Wi-Fi access points to the 3GPP-specified core network are being pursued. In the Wi-Fi alliance (WFA), activities related to certification of Wi-Fi products are undertaken, which to some extent is also driven from the need to make Wi-Fi a viable wireless technology for cellular operators to support high bandwidth offerings in their networks. In these standardization efforts, the term "Wi-Fi offload" is commonly used and indicates that cellular network operators seek means to offload traffic from their cellular networks to Wi-Fi, e.g., during peak-traffic-hours and in situations when the cellular network needs to be off-loaded for one reason or another, e.g., to provide a requested quality-of-service, to maximize bandwidth, or simply for improved coverage.

Traffic Offloading Using Wi-Fi

As noted above, using Wi-Fi/WLAN (the two terms are used interchangeably throughout this application) to offload traffic from the mobile networks is becoming more and more interesting from both the operator's and end user's points of view. Some of the reasons for this tendency are:

Additional frequency: by using Wi-Fi, operators can access an additional 85 MHz of radio bandwidth in the 2.4 GHz band and another (close to) 500 MHz in the 5 GHz band.

Cost: From the operator's point of view, Wi-Fi uses unlicensed frequency that is free of charge. On top of that, the cost of Wi-Fi Access Points (APs), both from capital expense (CAPEX) and operational expenses (OPEX) aspects, is often lower than that of a 3GPP base station (BS) (i.e. NodeB (NB) in case of UMTS or enhanced NodeB (eNB) in case of LTE. Operators can also take advantage of already deployed APs that are already deployed in hotspots such as train stations, airports, stadiums, shopping malls, etc. Most end users are also currently used to having Wi-Fi for free at home (as home broadband subscriptions are usually flat rate) and public places.

Terminal support: Many User Equipments (UEs—the term used to refer to mobile communication devices or terminals in 3GPP), including virtually all smart-phones, and other portable devices currently available in the market support Wi-Fi. In the Wi-Fi world, the term Station (STA) is used instead of UE, and as such the terms UE, STA and terminal are used interchangeably in this document.

High data rate: Under low interference conditions and assuming the user is close to the Wi-Fi AP, Wi-Fi can provide high peak data rates (for example, theoretically up to 600 Mbps for IEEE 802.11n deployments with MIMO (Multiple Input Multiple Output)).

For a wireless operator, offering a mix of two technologies that have been standardized in isolation from each other raises the challenge of providing intelligent mechanisms for co-existence. One area that needs these intelligent mechanisms is connection management.

Although, many of today's portable wireless devices (referred to hereinafter as "user equipments" or "UEs") support Wi-Fi in addition to one or several 3GPP cellular technologies, in many cases, however, these terminals essentially behave as two separate devices, from a radio access perspective. The 3GPP radio access network and the UE-based modems and protocols that are operating pursuant to the 3GPP specifications are generally unaware of the wireless access Wi-Fi protocols and modems that may be simultaneously operating pursuant to the 802.11 specifications. Techniques for coordinated control of these multiple radio-access technologies are needed.

A very simplified Wi-Fi architecture is illustrated in FIG. 1 and FIG. 2. On the user plane (FIG. 1), a very lean architecture is employed, where the UE/STA 20 is connected to the Wi-Fi Access Point (AP) 22, which can directly be connected to the Internet 24 and a remote application or service 26. In the control plane (FIG. 2), an Access point Controller (AC) 28 handles the management of the AP 22. One AC 28 usually handles the management of several APs 22. Security/authentication of users is handled via an Authentication, Authorization and Accounting (AAA) entity, which is shown as a RADIUS server in FIG. 2. Remote Administration Dial In User Service (RADIUS) is the most widely used network protocol for providing a centralized AAA management (and is described in RFC 2865 by The Internet Engineering Task Force (IETF), which is available from http://www.ietf.org/rfc/rfc2865.txt).

Hotspot 2.0

Different standards organizations have started to recognize the needs for an enhanced user experience for Wi-Fi access, this process being driven by 3GPP operators. An example of this is the Wi-Fi Alliance with the Hot-Spot 2.0 (HS2.0) initiative, now officially called PassPoint ("Hotspot 2.0 (Release 1) Technical Specification", Wi-Fi Alliance® Technical Committee Hotspot 2.0 Technical Task Group, V 1.0.0). HS2.0 is primarily geared toward Wi-Fi networks. HS2.0 builds on IEEE 802.11u, and adds requirements on authentication mechanisms and auto-provisioning support.

The momentum of Hot-Spot 2.0 is due to its roaming support, its mandatory security requirements and for the level of control it provides over the terminal for network discovery and selection. Even if the current release of HS2.0 is not geared toward 3GPP interworking, 3GPP operators are trying to introduce additional traffic steering capabilities, leveraging HS2.0 802.11u mechanisms. Because of the high interest of 3GPP operators, there will be a second release of HS2.0 focusing on 3GPP interworking requirements.

HS2.0 contains the following procedures:
1 Discovery: where the terminal discovers the Wi-Fi network, and probes it for HS2.0 support, using 802.11u and HS 2.0 extensions.
2 Registration is performed by the terminal toward the Wi-Fi Hot-spot network if there is no valid subscription for that network.
3 Provisioning: Policy related to the created account is pushed toward the terminal. This only takes place when a registration takes place.
4 Access: cover the requirements and procedures to associate with a HS2.0 Wi-Fi network.

One of the attractive aspects of HS2.0 is that it provides information for the STA that can be used to evaluate the load of the Wi-Fi network before attempting the authentication process, thereby avoid unnecessary connections to a highly loaded Wi-Fi network. The load conditions that the STA can evaluate are the following:

BSS load element—This is actually a part of the original IEEE 802.11 standard and provides information about the AP population and the current over-the-air traffic levels, as shown in FIG. 3. It is obtained either via a Beacon or a Query Response frame and is used for vendor-specific AP-selection algorithms. The element is described in detail in Chapter 8.4.2.30 of IEEE 802.11: IEEE Standard for Information technology—Telecommunications and information exchange between systems: Local and metropolitan area networks—Specific requirements—Part 11: Wireless LAN Medium Access Control (MAC) and Physical Layer (PHY) Specifications (2012). The most relevant field is the "Channel Utilization" field, which states the amount of time that the AP senses the medium as busy.

WAN metrics element—This is one of the extra features that HotSpot™ 2.0 adds to the IEEE 802.11u amendment. The element, illustrated in FIG. 4, can be obtained via an access network query protocol (ANQP) query (by requesting the element "ANQP Vendor Specific list") and it provides information about the AP's uplink/downlink wide area network (WAN) (backhaul) speed, as well as the uplink/downlink load. The element is described in detail in Chapter 4.4 of the HS2.0 specification.

Wi-Fi/3GPP Integration Mechanisms

No Integration—

Most current Wi-Fi deployments are totally separate from mobile networks, and are to be seen as non-integrated (see FIG. 5). From the terminal 60 perspective, most mobile operating systems (OS) for UEs such as Android and iOS, support a simple Wi-Fi offloading mechanism, where the UEs 60 immediately switch all their PS (Packet Switched) bearers to a Wi-Fi network 62 from a fixed network 64 upon a detection of such a Wi-Fi network 62 with a certain signal level. The decision to offload to a Wi-Fi network 62 or not is referred henceforth as "access selection strategy" or "access network selection" and the aforementioned strategy of selecting Wi-Fi whenever such a network is detected is known as "Wi-Fi-if-coverage".

There are several drawbacks of the Wi-Fi-if-coverage strategy (illustrated in FIG. 8):

Though the user/UE 60 can save previous passcodes for already accessed Wi-Fi Access Points (APs) 62, hotspot login for previously unaccessed APs usually requires user intervention, either by entering the passcode in Wi-Fi connection manager or using a web interface.

Interruptions of ongoing services can occur due to the change of IP address when the UE 60 switches to the Wi-Fi network 62. For example, a user who started a VoIP call while connected to a mobile network 64 is likely to experience call drop when arriving home and the UE switching to the Wi-Fi network 62 automatically. Some applications are smart enough to handle this and to survive the IP address change, but the majority of current applications cannot. It also places a lot of burden on application developers if they have to ensure service continuity.

No consideration of expected radio performance is made, and this can lead to a UE 60 being handed over from a high data rate mobile network link to a low data rate via the Wi-Fi link. Even though the UE's OS or some high level software is smart enough to make the offload decisions only when the signal level on the Wi-Fi network 62 is considerably better than the mobile network link, there can still be limitations on the backhaul (e.g. an xDSL connection) that the Wi-Fi AP 62 is using that may end up being the bottle neck.

No consideration of the load conditions in the mobile network 64 and Wi-Fi network 62 is made. As a result, the UE 60 might still be offloaded to a Wi-Fi AP 62 that is serving several UEs 60 while the mobile network 64 (e.g., LTE, 3G) that it was previously connected to is rather unloaded.

No consideration of the UE's mobility is made. Due to this, a fast moving UE 60 can end up being offloaded to a Wi-Fi AP 62 for a short duration, just to be handed over back to the mobile network 64. This is especially a problem in scenarios like cafes with open Wi-Fi, where a user walking by or even driving by the cafe might be affected by this. Such 'ping pong' between the Wi-Fi network 62 and mobile network can cause service interruptions as well as generate considerable unnecessary signalling (e.g. towards authentication servers).

In order to combat these problems, several Wi-Fi/3GPP integration mechanisms have been proposed.

Common Authentication—

The idea behind common authentication is based on the use of automatic subscriber identity module (SIM)-based authentication in both access types. Extensible Authentication Protocol (EAP) is an authentication framework that provides support for the different authentication methods. Described by the IETF document RFC 3748 and (available from http://tools.ietf.org/html/rfc3748) later updated by RFC 5247 (available from http://tools.ietf.org/html/rfc5247), this protocol is carried directly over data-link layer (DLL) and is currently widely deployed in WLANs. The EAP framework specifies over 40 different methods for authentication, and EAP-SIM (Subscriber Identity Module) is the one that is becoming widely available in UEs and networks. FIG. 7 illustrates common authentication via EAP-SIM. A SIM 66 is shown for the UE 60 that is used in the common authentication of the user to the Wi-Fi network 62 and fixed network 64. A key benefit of common authentication is that the user doesn't necessarily have to be actively involved in the authentication process, which will increase the chances of more traffic to be steered to the Wi-Fi side, paving the way for network centric control.

User Plane Integration—

Wi-Fi user plane integration provides the mobile operator the opportunity to provide the same services, like parental control and subscription based payment methods, for the end users when connected both via 3GPP and via Wi-Fi. The solutions also include the possibility to offload parts of the user plane from the mobile core so that not all traffic needs to be brought to the mobile core network.

Different solutions are being standardized in 3GPP. Overlay solutions (S2b, S2c) are specified since 3GPP Rel-8, while integration solutions (S2a) are currently a work-in-progress (S2a, S2b, S2c indicate the 3GPP interface/reference point name towards the PDN-GW). FIG. 8 and FIG. 9 show a high level view and an architectural overview of user plane integration, respectively. With user plane integration, it is possible to access operator services like parental control, multimedia messaging (MMS), subscription payments and it is possible to still offload selected parts of traffic.

RAN Level Integration—

A further level of integration can be realized via access selection based on RAN information on both 3GPP and Wi-Fi, in addition to the common authentication and user plane integration methods discussed above.

SUMMARY

One issue with currently existing technologies, such as those described above, is that the terminal/UE decides when to move from a 3GPP network (or other cellular network) to a WLAN based on its own criteria or criteria downloaded (or broadcast) from the network such as via an Access Network Discovery and Selection Function (ANDSF) server or by other applications. This may result in a lot of signalling when many terminals move to WLAN at the same time when suddenly a criterion is fulfilled (with all or some bearers if a (e.g. ANDSF) policy restricts which services should move), and/or when terminals move whenever a terminal enters coverage of a WLAN AP. The resulting load distribution between WLAN and 3GPP may not be the preferred distribution, and quality of service may even be worse than before.

In other words, the network cannot individually control when a terminal goes to WLAN and moves some or all of its ongoing bearers/connections. There could be mass-toggling with high signalling load, resulting in non-optimal usage of the wide area radio network with possibly lower quality of service to users.

Improved methods and apparatus for network control of a terminal's WLAN connection are therefore needed.

Embodiments of the present invention include methods allowing the 3GPP network to control when a terminal should perform certain actions with regards to WLAN by using message fields used to carry threshold values. For example, a field for indicating a WLAN RSSI-threshold can be set by the 3GPP network to its maximum value to indicate that the terminal should refrain from connecting to a WLAN network.

An example method, implemented in a mobile terminal, begins with receiving, from a first radio access network, one or more threshold values and/or conditions for use in determining how the mobile terminal should handle connections to the second radio access network, wherein the one or more threshold values and/or conditions are received in a message field used to carry threshold values. The method continues with carrying out one or more actions with respect to the second radio access network, based on the received one or more threshold values and/or conditions. The first and second radio access networks are a cellular telecommunications network (such as a 3GPP LTE network, for instance) and a wireless local-area network (such as a Wi-Fi network, for instance), in some embodiments.

In some embodiments, the one or more actions comprise one or more of the following: establishing or refraining from establishing a connection to the second radio access network; connecting to or disconnecting from the second radio access network; sending or refraining from sending measurement reports regarding the second radio access network to the first radio access network; steering traffic or refraining from the steering of traffic to the second radio access network; moving some or all traffic from the second radio access network to the first radio access network (or vice versa); turning on or refraining from turning on mobile terminal access functionality for radio access technology of the type supported by the second radio access network; turning on or turning off mobile terminal access functionality for radio access technology of the type supported by the second radio access network; and switching mobile access functionality for radio access technology of the type supported by the second radio access network into or out of a power saving state or mode. In some embodiments, the one or more actions carried out are further based on a state of the mobile terminal with respect to the second radio access network, such that different states can result in different actions, given the same threshold values and/or conditions.

Corresponding embodiments of methods carried out by a network node (e.g. a base station), as well as corresponding embodiments of a mobile terminal apparatus and network node (e.g. base station) apparatus, are described in detail below.

According to a first aspect there is provided a method, in a mobile terminal, for handling connections to two radio access technologies, the method comprising receiving, from a first radio access network, one or more threshold values and/or conditions for use in determining how the mobile terminal should handle connections to the second radio access network, wherein the one or more threshold values and/or conditions are received in a message field used to carry threshold values; and carrying out one or more actions with respect to the second radio access network, based on the received one or more threshold values and/or conditions.

In some embodiments, the message field is normally used to carry threshold values for regulating mobile terminal behavior towards the first radio access network and/or the second radio access network.

In some embodiments, the one or more actions comprise one or more of the following refraining from establishing a connection to the second radio access network; disconnecting from the second radio access network; refraining from sending measurement reports regarding the second radio access network to the first radio access network; refraining from the steering of traffic to the second radio access network; moving some or all traffic from the second radio access network to the first radio access network; refraining from turning on mobile terminal access functionality for radio access technology of the type supported by the second radio access network; turning off mobile terminal access functionality for radio access technology of the type supported by the second radio access network; putting mobile access functionality for radio access technology of the type supported by the second radio access network into a power saving state or mode.

In some embodiments, the one or more actions carried out are further based on a state of the mobile terminal with respect to the second radio access network, such that different states can result in different actions, given the same threshold values and/or conditions. In these embodiments, the carrying out of one or more actions can comprise, in response to a particular threshold value, disconnecting from the second radio access network if connected to the second radio access network and otherwise refraining from connecting to the second radio access network.

In some embodiments, the method further comprises determining that a received threshold value or condition indicates an impossible threshold or condition, wherein said carrying out of the one or more actions is responsive to said determining.

In some embodiments, said carrying out one or more actions is further conditioned on one or more other controlling mechanisms applicable to the mobile terminal.

In some embodiments, the first radio access network is a cellular telecommunications network and the second radio access network is a wireless local area network.

In some embodiments, the wireless local area network is an IEEE 802.11 network and the cellular telecommunications network is an LTE network.

According to a second aspect, there is provided a method, in a base station of a first radio access network, for managing connections of a mobile terminal to a second radio access network, the method comprising determining, for the mobile terminal, one or more threshold values and/or conditions for use in determining how the mobile terminal should handle connections to the second radio access network; and sending the one or more threshold values and/or conditions to the mobile terminal, using a message field used to carry threshold values.

In some embodiments, the message field is normally used to carry threshold values for regulating mobile terminal behavior towards the first radio access network and/or the second radio access network.

In some embodiments, the one or more threshold values and/or conditions indicate one or more actions to be taken by the mobile terminal with respect to the second wireless access network, the one or more actions comprising one or more of the following refraining from establishing a connection to the second radio access network; disconnecting from the second radio access network; refraining from sending measurement reports regarding the second radio access network to the first radio access network; refraining from the steering of traffic to the second radio access network; moving some or all traffic from the second radio access network to the first radio access network; refraining from turning on mobile terminal access functionality for radio access technology of the type supported by the second radio access network; turning off mobile terminal access functionality for radio access technology of the type supported by the second radio access network; putting mobile access functionality for radio access technology of the type supported by the second radio access network into a power saving state or mode.

In some embodiments, determining one or more threshold values and/or conditions comprises determining an impossible threshold value or condition.

In some embodiments, the first radio access network is a cellular telecommunications network and the second radio access network is a wireless local area network.

In some embodiments, the wireless local area network is an IEEE 802.11 network and the cellular telecommunications network is an LTE network.

In some embodiments, the one or more threshold values and/or conditions indicate an one or more actions to be taken by the mobile terminal with respect to the second radio access network, and wherein the step of determining comprises determining one or more actions to be taken by the mobile terminal with respect to the second radio access network; and determining one or more threshold values and/or conditions for the determined one or more actions for sending to the mobile terminal.

According to a third aspect, there is provided a mobile terminal apparatus comprising radio circuitry adapted to handle connections to two radio access technologies and a processing circuit adapted to receive, from a first radio access network, one or more threshold values and/or conditions for use in determining how the mobile terminal should handle connections to the second radio access network, wherein the one or more threshold values and/or conditions are received in a message field used to carry threshold values; and carry out one or more actions with respect to the second radio access network, based on the received one or more threshold values and/or conditions.

In some embodiments, the message field is normally used to carry threshold values for regulating mobile terminal behavior towards the first radio access network and/or the second radio access network.

In some embodiments, the one or more actions comprise one or more of the following: refraining from establishing a connection to the second radio access network; disconnecting from the second radio access network; refraining from sending measurement reports regarding the second radio access network to the first radio access network; refraining from the steering of traffic to the second radio access network; moving some or all traffic from the second radio access network to the first radio access network; refraining from turning on mobile terminal access functionality for radio access technology of the type supported by the second radio access network; turning off mobile terminal access functionality for radio access technology of the type supported by the second radio access network; putting mobile access functionality for radio access technology of the type supported by the second radio access network into a power saving state or mode.

In some embodiments, the processing circuit is adapted to carry out the one or more actions based further on a state of the mobile terminal with respect to the second radio access network, such that different states can result in different actions, given the same threshold values and/or conditions.

In some embodiments, the processing circuit is adapted to carry out the one or more actions by, in response to a particular threshold value, disconnecting from the second radio access network if connected to the second radio access network and otherwise refraining from connecting to the second radio access network.

In some embodiments, the processing circuit is further adapted to determine that a received threshold value or condition indicates an impossible threshold or condition, and wherein the processing circuit is adapted to carry out the one or more actions in response to said determining.

In some embodiments, the processing circuit is further adapted to condition the carrying out of the one or more actions on one or more other controlling mechanisms applicable to the mobile terminal.

In some embodiments, the first radio access network is a cellular telecommunications network and the second radio access network is a wireless local area network.

In some embodiments, the wireless local area network is an IEEE 802.11 network and the cellular telecommunications network is an LTE network.

According to a fourth aspect, there is provided a base station apparatus adapted for use in a first radio access network according to a first radio access technology, for managing connections of a mobile terminal to a second radio access network of a second radio access technology, the base station apparatus comprising radio circuitry adapted to handle connections to one or more mobile terminals according to the first radio access technology and a processing circuit adapted to determine, for a mobile terminal, one or more threshold values and/or conditions for use in determining how the mobile terminal should handle connections to the second radio access network; and send the one or more threshold values and/or conditions to the mobile terminal, using a message field used to carry threshold values.

In some embodiments, the message field is normally used to carry threshold values for regulating mobile terminal behavior towards the first radio access network and/or the second radio access network.

In some embodiments, the one or more threshold values and/or conditions indicate one or more actions to be taken by the mobile terminal with respect to the second wireless access network, the one or more actions comprising one or more of the following refraining from establishing a connection to the second radio access network; disconnecting from the second radio access network; refraining from sending measurement reports regarding the second radio access network to the first radio access network; refraining from the steering of traffic to the second radio access network; moving some or all traffic from the second radio access network to the first radio access network; refraining from turning on mobile terminal access functionality for radio access technology of the type supported by the second radio access network; turning off mobile terminal access functionality for radio access technology of the type supported by the second radio access network; putting mobile access functionality for radio access technology of the type supported by the second radio access network into a power saving state or mode.

In some embodiments, the processing circuit is adapted to determine the one or more threshold values and/or conditions by determining an impossible threshold value or condition.

In some embodiments, the first radio access network is a cellular telecommunications network and the second radio access network is a wireless local area network.

In some embodiments, the wireless local area network is an IEEE 802.11 network and the cellular telecommunications network is an LTE network.

In some embodiments, the one or more threshold values and/or conditions indicate an one or more actions to be taken by the mobile terminal with respect to the second radio access network, wherein the processing circuit is adapted to determine, for a mobile terminal, one or more threshold values and/or conditions by determining one or more actions to be taken by the mobile terminal with respect to the second radio access network; and determining one or more threshold values and/or conditions for the determined one or more actions for sending to the mobile terminal.

According to a fifth aspect, there is provided a computer program product having a set of computer program instructions embodied therein, the computer program instructions being configured such that, on execution by a processor, the processor is caused to carry out any of the methods described above.

BRIEF DESCRIPTION OF THE DRAWINGS

Exemplary embodiments of the techniques introduced in this document are described below with reference to the following figures, in which.

DETAILED DESCRIPTION

Figure 1:
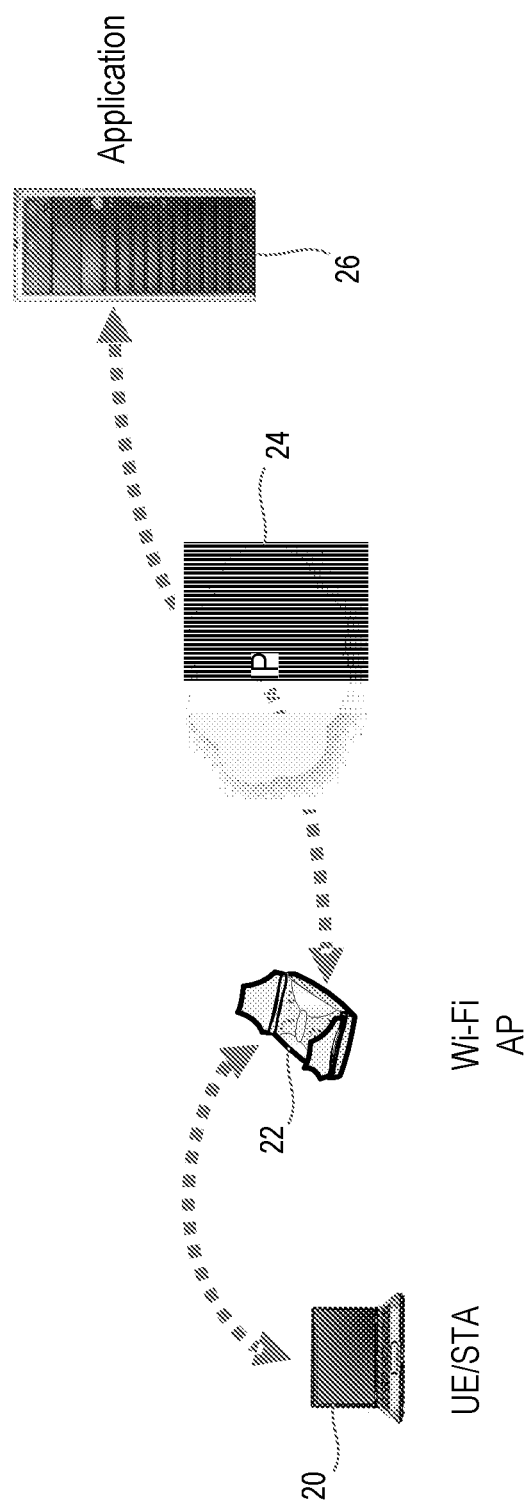
FIGS. 1 and 2 show a simplified architecture of a W-Fi network.
Figure 2:
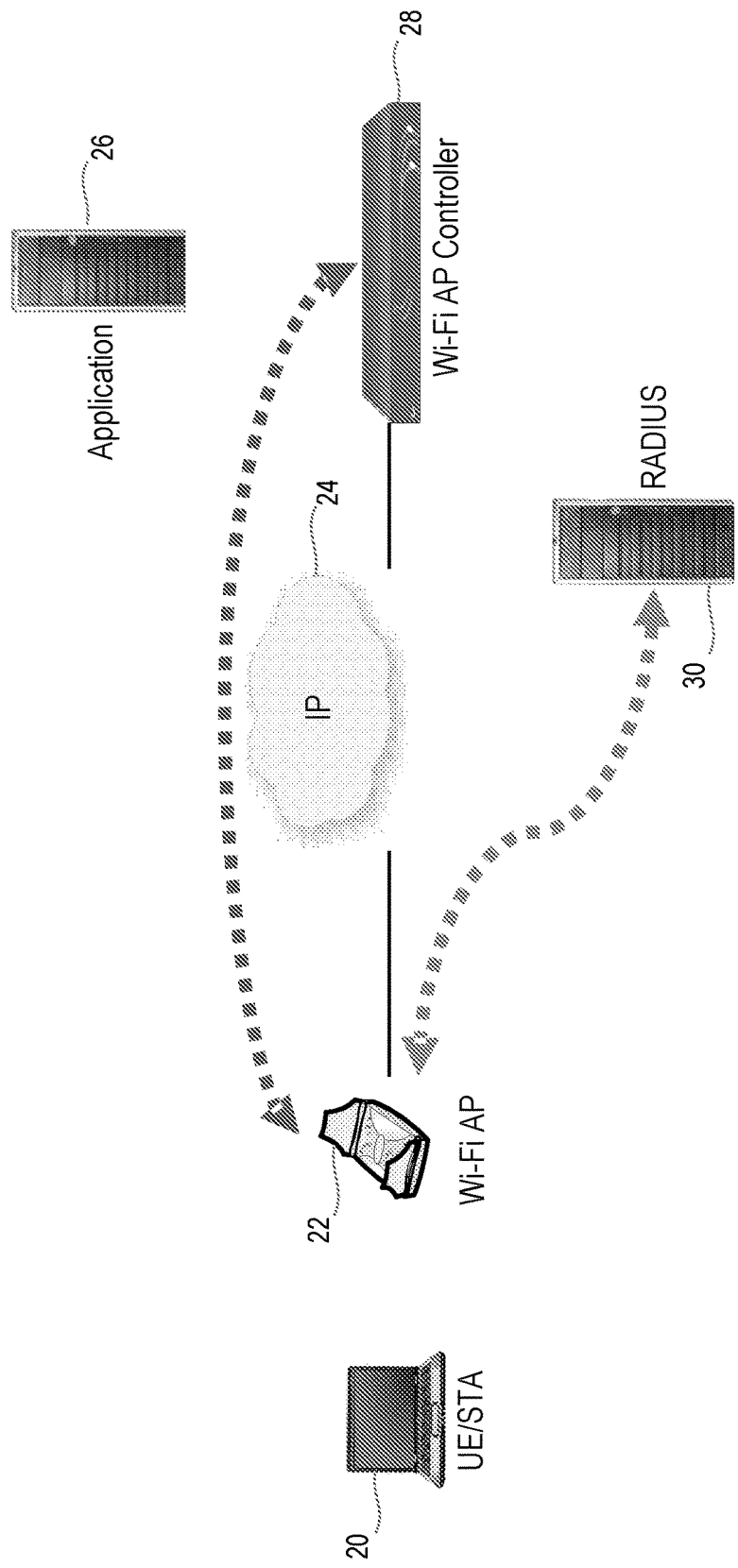
Figure 3:
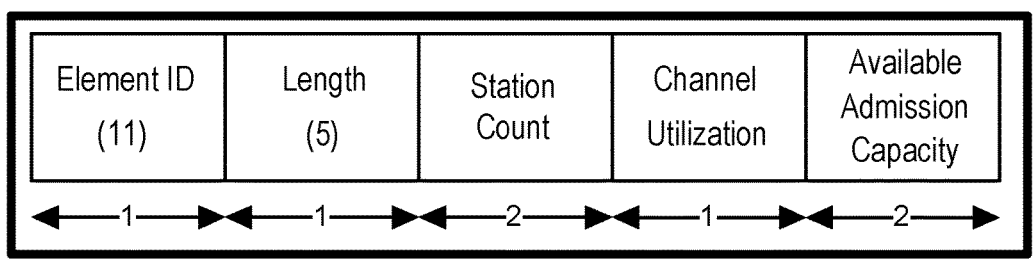
FIGS. 3 and 4 illustrate BSS load and WAN metrics elements.
Figure 4:
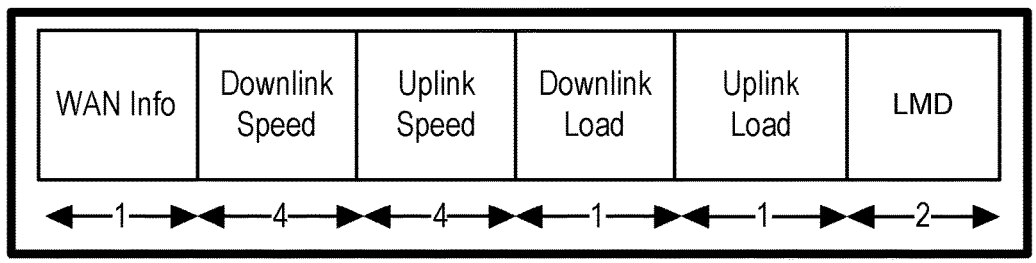
Figure 5:
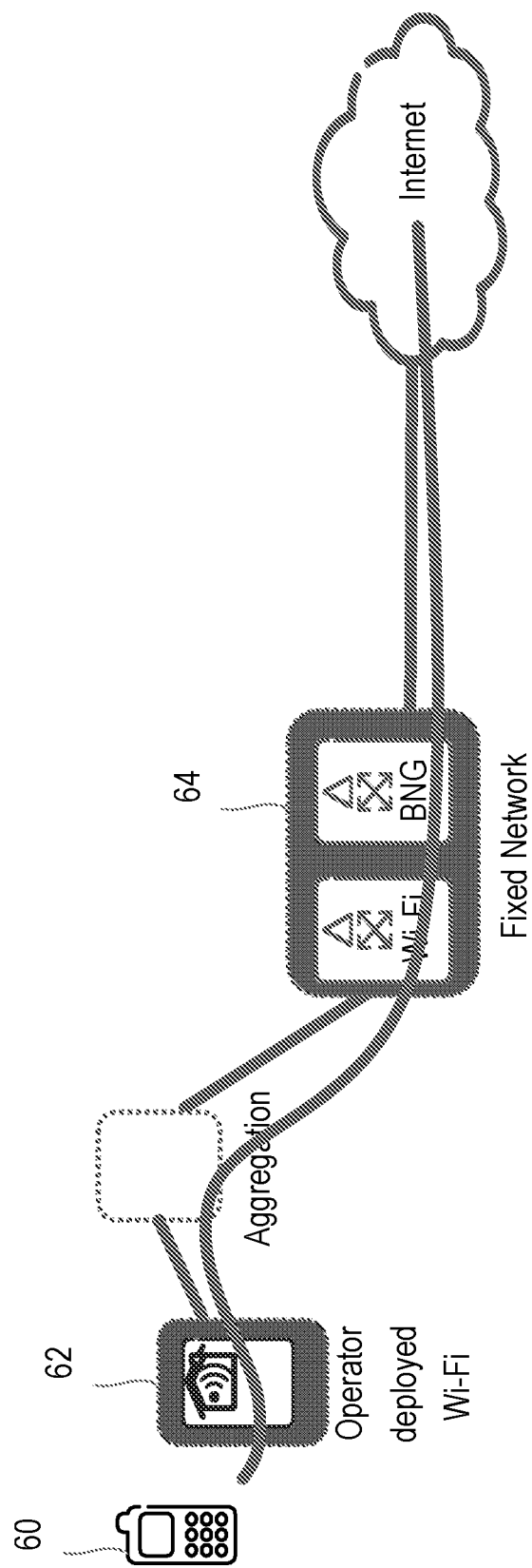
FIG. 5 illustrates a W-Fi network that is not integrated into a mobile network.
Figure 6:
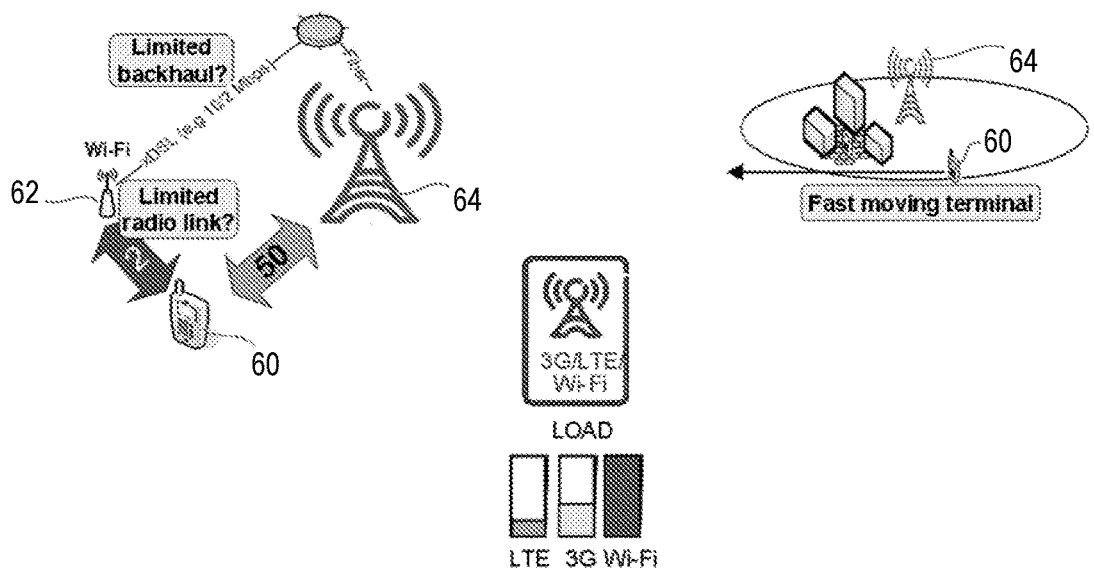
FIG. 6 illustrates some of the drawbacks of a Wi-Fi-if-coverage strategy method of access network selection.
Figure 7:
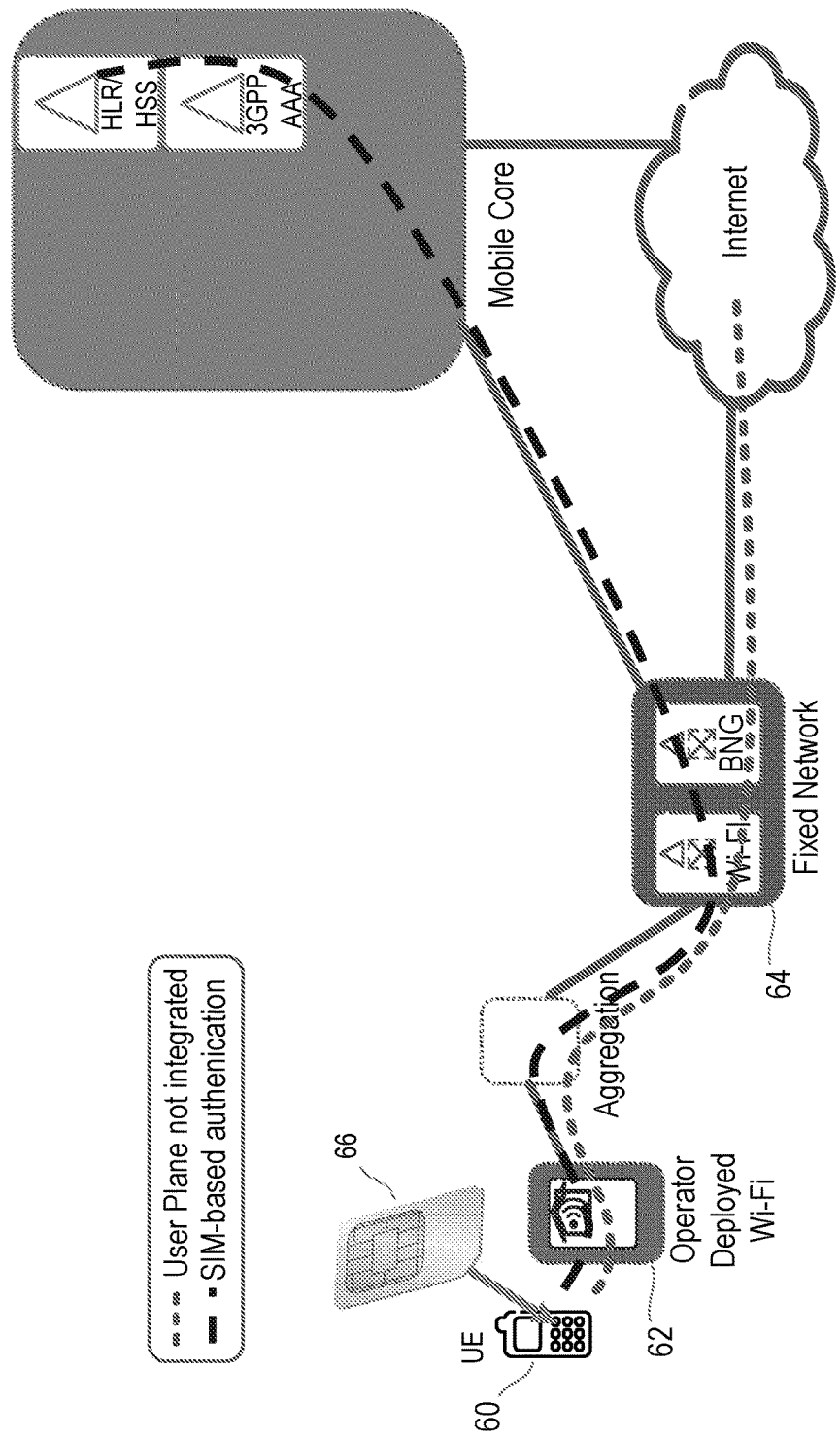
FIG. 7 is an illustration of integration of Wi-Fi and a mobile cellular network using common authentication.
Figure 8:
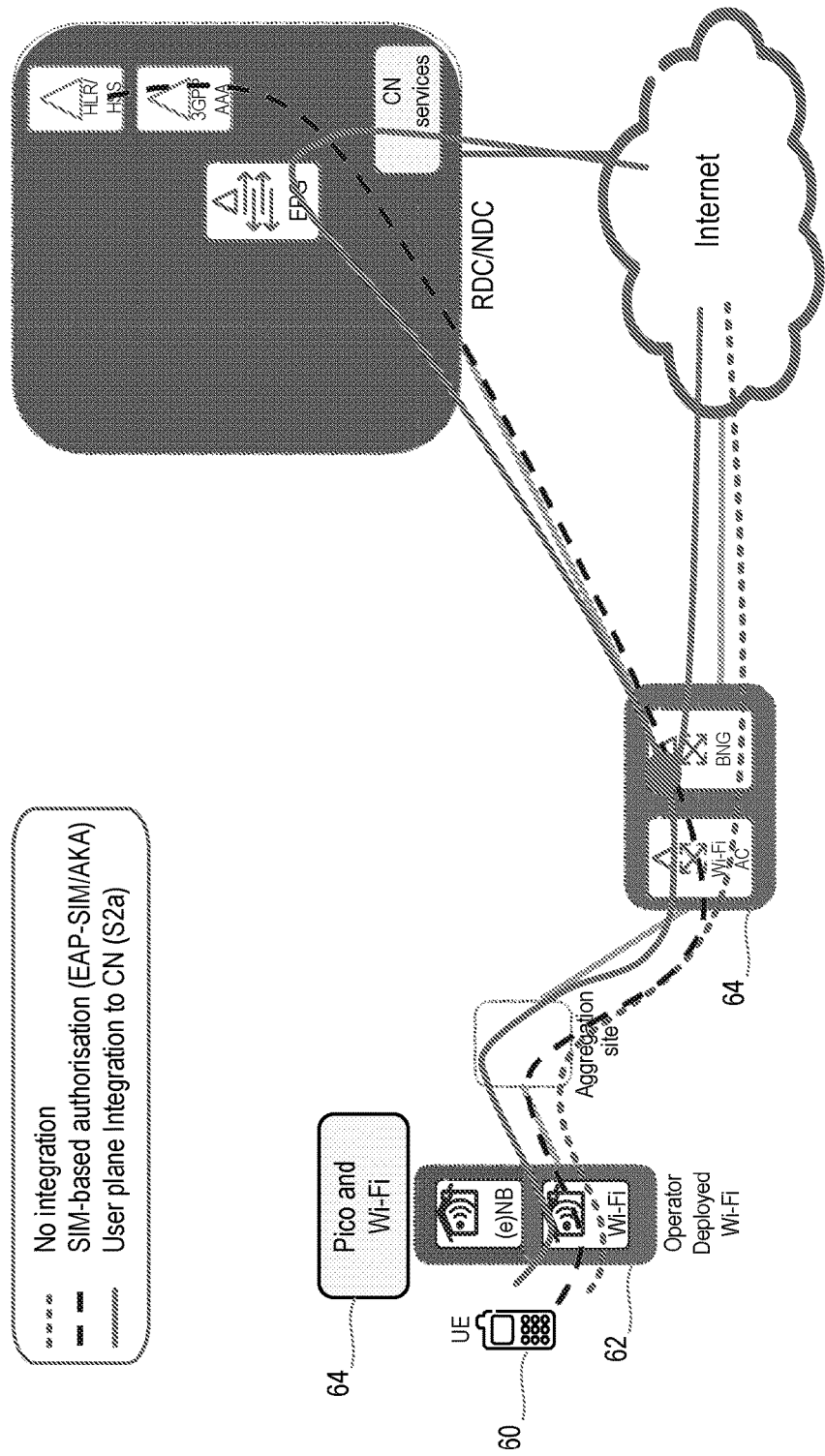
FIG. 8 is an illustration of user plane integration of Wi-Fi and a mobile cellular network.
Figure 9:
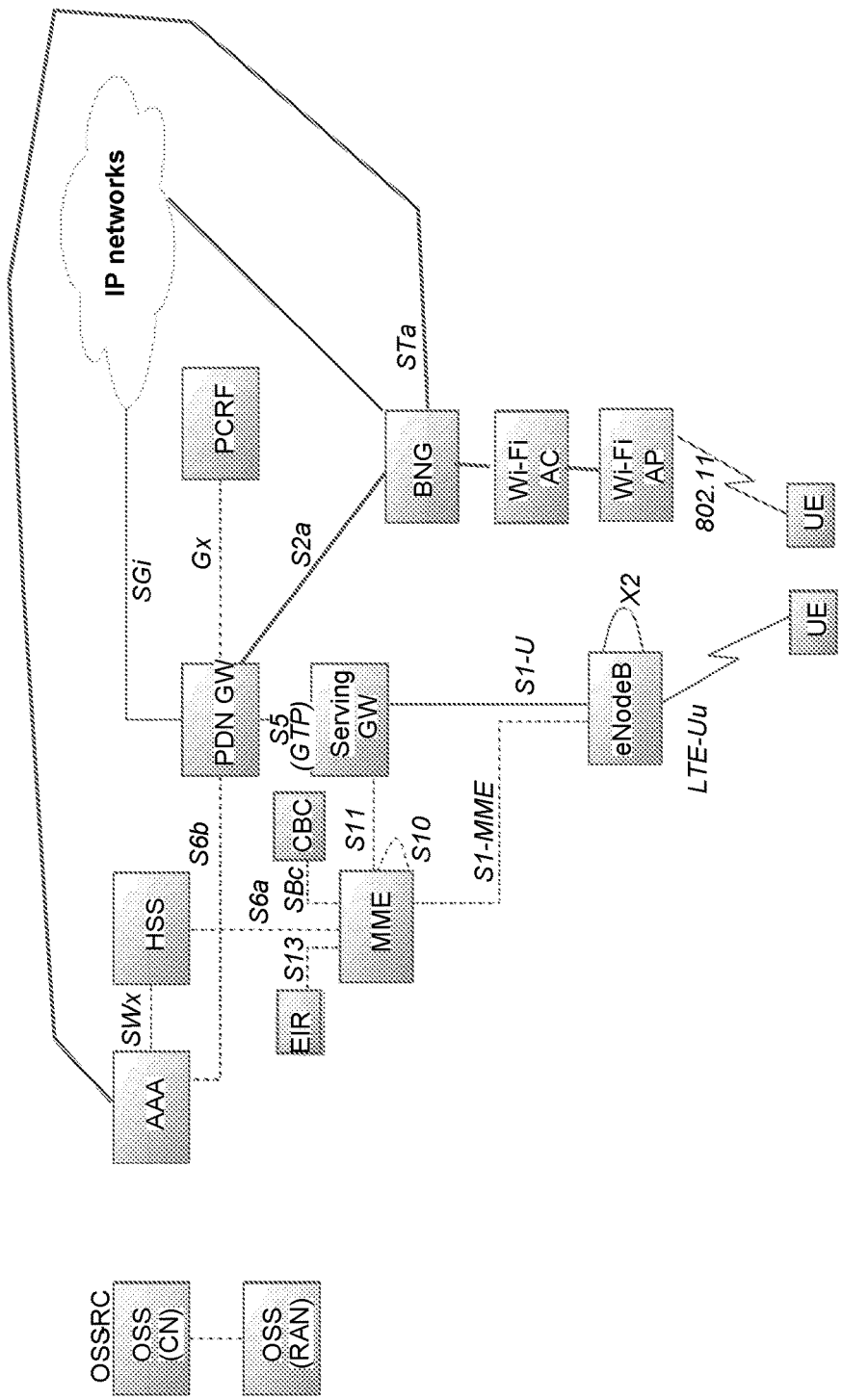
FIG. 9 is an architectural overview of E-UTRAN/EPC and S2a integration.

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, application-specific integrated circuits (ASICs), programmable logic arrays (PLAs), digital signal processors (DSPs), reduced instruction set processors, field programmable gate arrays (FPGAs), state machines capable of performing such functions, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The discussion that follows frequently refers to "mobile terminals," "terminals," or "UEs," the latter of which is the 3GPP term for end user wireless devices. It should be appreciated, however, that the techniques and apparatus described herein are not limited to 3GPP UEs, but are more generally applicable to end user wireless devices (e.g., portable cellular telephones, smartphones, wireless-enabled tablet computers, etc.) that are useable in cellular systems. It should also be noted that the current disclosure relates to end user wireless devices that support both a wireless local area network (WLAN) technology, such as one or more of the IEEE 802.11 standards, and a wide-area cellular technology, such as any of the wide-area radio access standards maintained by 3GPP. End user devices are referred to in Wi-Fi document as "stations", or "STA"—it should be appreciated that the term "UE" as used herein should be understood to refer to a STA, and vice-versa, unless the context clearly indicates otherwise. It should also be noted that the current disclosure also relates to end user wireless devices that support both a wide-area cellular technology, such as any of the wide-area radio access standards maintained by 3GPP, and a non-3GPP standardized RAT, such as the Global System for Mobile Communications (GSM), and for which improvements to the selection of the access network are desired.

As used herein, a "base station" comprises in a general sense any node transmitting radio signals in the downlink (DL) to a mobile device and/or receiving radio signals in the uplink (UL) from the mobile device. Some example base stations are eNodeB, eNB, Node B, macro/micro/pico/femto radio base station, home eNodeB (also known as femto base station), relay, repeater, sensor, transmitting-only radio nodes or receiving-only radio nodes. A base station may operate or at least perform measurements in one or more frequencies, carrier frequencies or frequency bands and may itself be capable of carrier aggregation. It may also be a single-radio access technology (RAT), multi-RAT, or multi-standard node, e.g., using the same or different base band modules for different RATs. Although the embodiments described below refer to a macrocell base station, it will be appreciated that the teachings of this application are applicable to any type of base station (e.g. femtocell base stations, picocell base stations, microcell base station, etc.) whether deployed in a homogeneous or heterogeneous network.

The signalling described is either via direct links or logical links (e.g. via higher layer protocols and/or via one or more network nodes). For example, signalling from a coordinating node may pass another network node, e.g., a radio node.

Overall E-UTRAN Architecture

Figure 10:
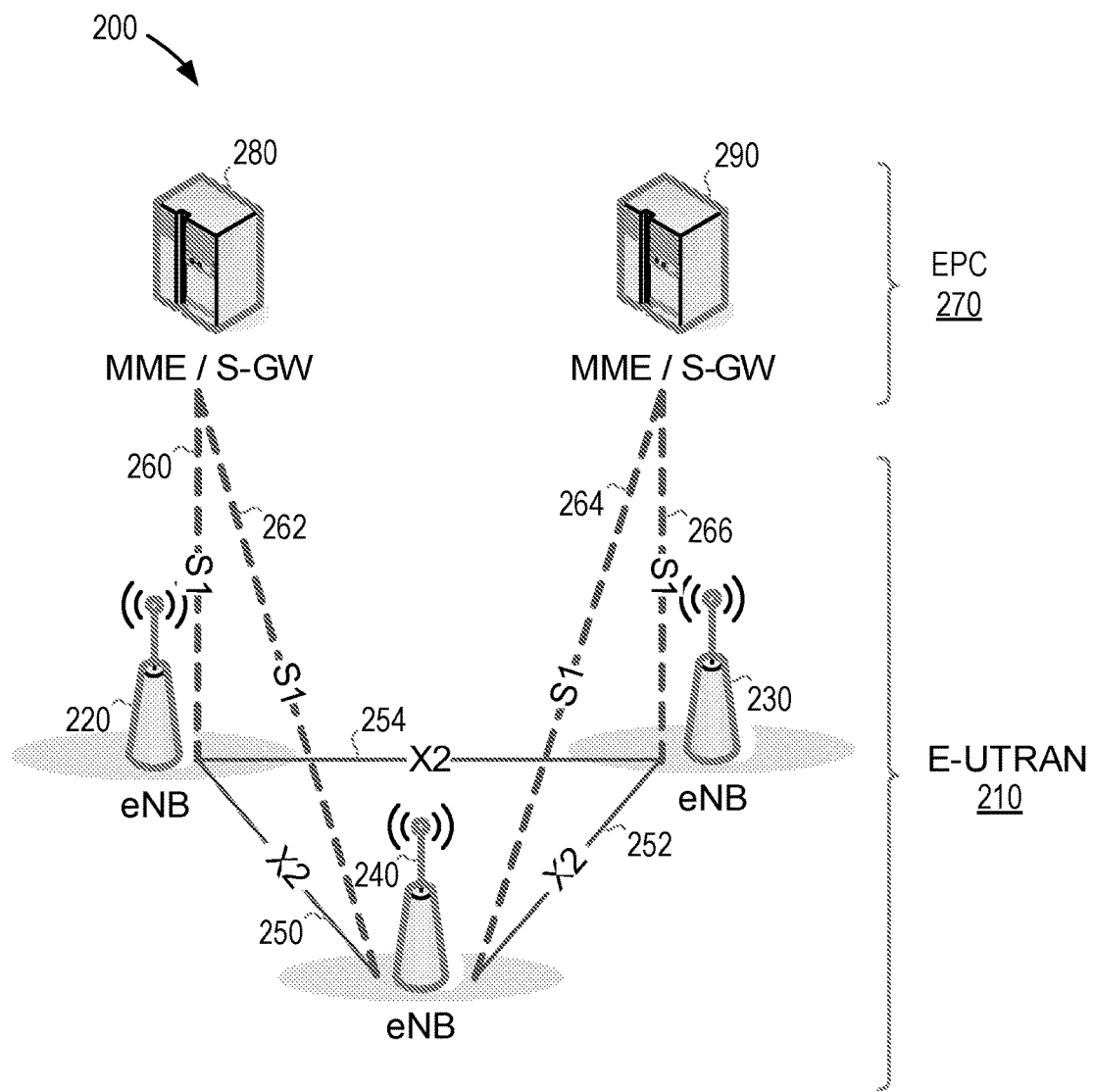
FIG. 10 is a diagram illustrating the overall architecture of an LTE network.

An exemplary Evolved UMTS Terrestrial Radio Access Network (E-UTRAN) 210 architecture is shown in FIG. 10. The E-UTRAN architecture 210 consists of base stations 220, 230, 240 called enhanced NodeBs (eNBs or eNodeBs), which provide the E-UTRA user plane and control plane protocol terminations towards the User Equipment (UE). The eNBs 220, 230, 240 are interconnected with each other by means of the X2 interface 250, 252, 254. The eNBs 220, 230, 240 are also connected by means of the S1 interface (260, 262, 264, 266) to the EPC (Evolved Packet Core) 270, more specifically to the MME (Mobility Management Entity) 280, 290, by means of the S1-MME interface, and to the Serving Gateway (S-GVV) 280, 290 by means of the S1-U interface. The S1 interface supports many-to-many relations between MMEs/S-GWs and eNBs.

Figure 11:
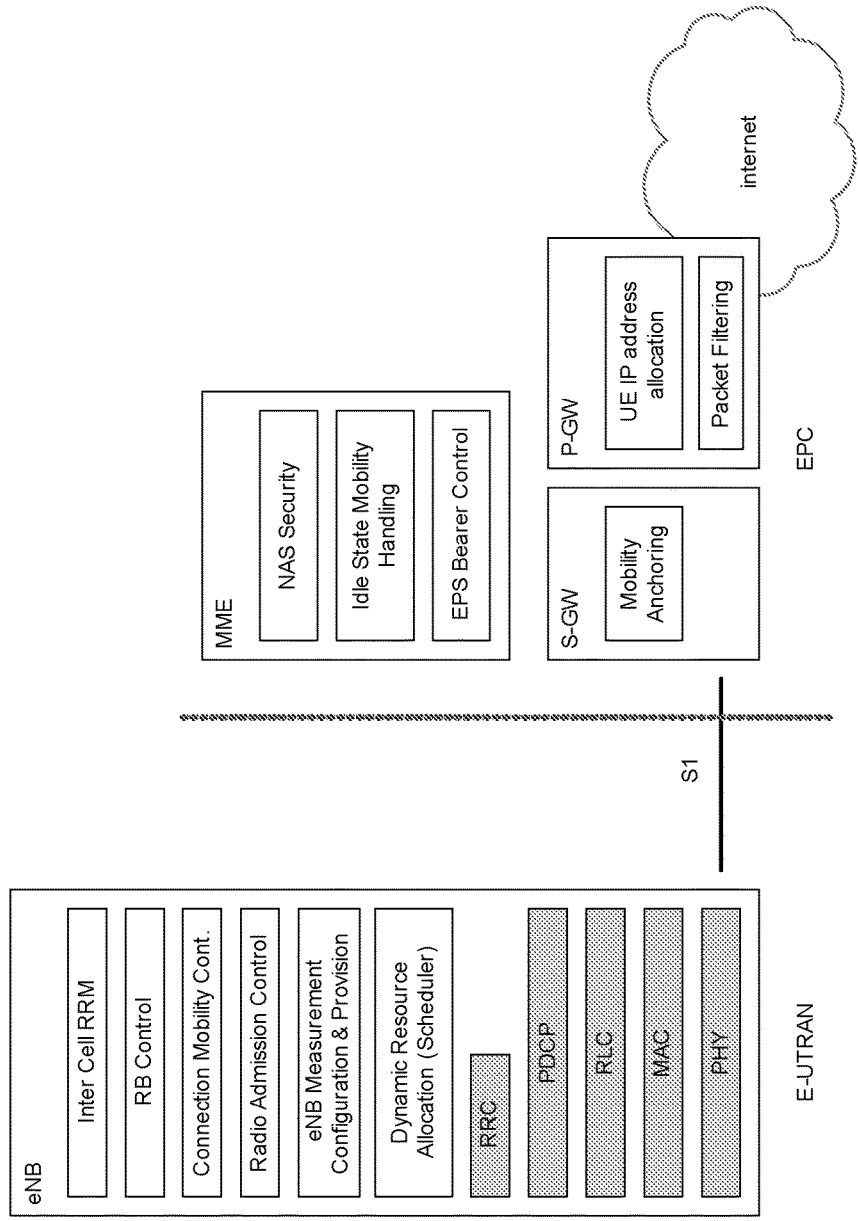
FIG. 11 is a diagram illustrating the functional split between E-UTRAN and EPC.

The eNB hosts functionalities such as Radio Resource Management (RRM), radio bearer control, admission control, header compression of user plane data towards serving gateway, and routing of user plane data towards the serving gateway. The MME 280, 290 is the control node that processes the signalling between the UE and the core network 270. The main functions of the MME 280, 290 are related to connection management and bearer management, which are handled via Non Access Stratum (NAS) protocols. The S-GW 280, 290 is the anchor point for UE mobility, and also includes other functionalities such as temporary downlink data buffering while the UE is being paged, packet routing and forwarding the right eNB, gathering of information for charging and lawful interception. A Packet Data Network (PDN) Gateway (P-GW) is the node responsible for UE Internet Protocol (IP) address allocation, as well as Quality of Service (QoS) enforcement. FIG. 11 gives a summary of the functionalities of the different nodes, and the reader is referred to the 3GPP document "Evolved Universal Terrestrial Radio Access (E-UTRA) and Evolved Universal Terrestrial Radio Access Network (E-UTRAN); Overall Description; Stage 2," 3GPP TS 36.300, v. 11.3.0 (September 2012), available at www.3gpp.org, and the references therein for the details of the functionalities of the different nodes. In FIG. 11, the boxes labelled "eNB," "MME," "S-GW," and "P-GW" depict the logical nodes, the unshaded white boxes within the larger boxes depict the functional entities of the control plane, and the shaded blue boxes within the box labelled "eNB" depict the radio protocol layers.

Figure 12:
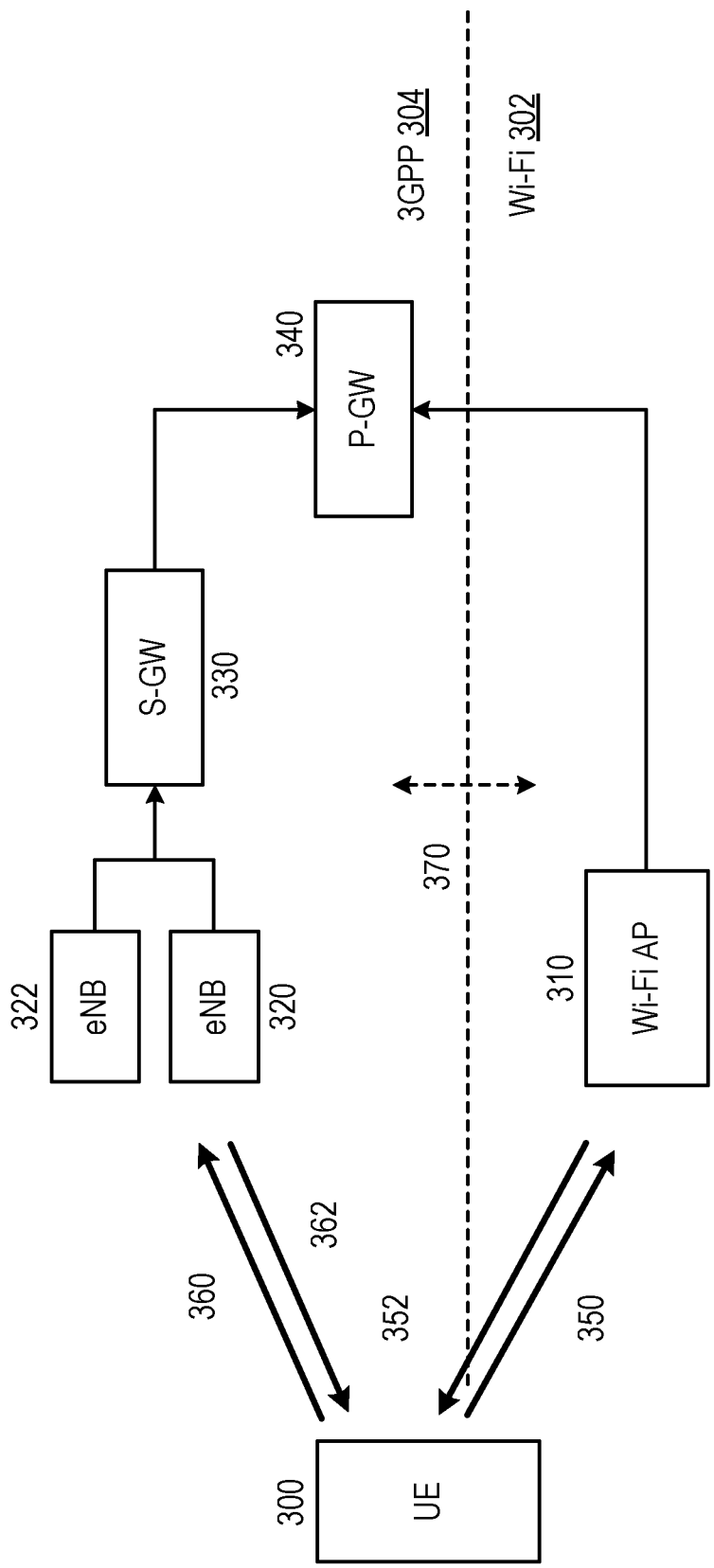
FIG. 12 illustrates part of a LTE network and a W-Fi network.

FIG. 12 illustrates a network where the LTE radio access parts (eNBs) 320, 322 and a Wi-Fi wireless access point 310 are both connected to the same P-GW 340. In the case of the LTE radio access parts, the eNBs 320, 322 are connected to the P-GW 340 via an S-GW 330. A UE 300 is shown that is capable of being served both from the Wi-Fi Access Point 310 and the LTE eNBs 320, 322. Arrows 350 and 352 illustrate the uplink (UL) and downlink (DL) transmissions between the UE 300 and the Wi-Fi AP 310 respectively and arrows 360 and 362 illustrate the uplink (UL) and downlink (DL) transmissions between the UE 300 and the eNBs respectively. FIG. 12 illustrates one possible way of connecting a Wi-Fi access network 302 to the same core network as the 3GPP-specified access network 304. It should be noted that the presently disclosed techniques are not restricted to scenarios where the Wi-Fi access network 302 is connected in this way; scenarios where the networks are more or completely separate, such as shown in FIG. 5, 7, 8 or 9 are also possible.

In the following description of the various solutions provided by the present disclosure, the arrangement shown in FIG. 12 is used as a basis for the explanation, and references in the description below to a terminal/UE, eNB, 3GPP network/RAN/RAT, Wi-Fi AP and WLAN are to the UE 300, eNB 320, 3GPP network/RAN/RAT 304, Wi-Fi AP 310 and WLAN 302 shown in FIG. 12. However, it will be appreciated that the various solutions provided by the present disclosure are not limited to implementation in the arrangement shown in FIG. 12.

As noted above, many smartphones on the market today support Wi-Fi connectivity (or, more generally, WLAN connectivity), in addition to supporting one or more cellular radio-access technologies (RATs), such as the several RATs standardized by 3GPP (e.g. LTE, UMTS, HSPA, GSM, etc.). As will be detailed below, a network (e.g. a 3GPP network) can control how a terminal should handle a WLAN connection, e.g. when to connect to WLAN, by using thresholds and conditions.

Network Control of a Terminal's WLAN Connection

One way to implement 3GPP network control with regards to how a terminal 300 handles WLAN 302 is by use of thresholds and conditions. According to this approach, the 3GPP network 304 signals to the terminal 300 a set of thresholds and conditions which dictate how the terminal 300 should handle a WLAN entity 302. The thresholds could, for example, dictate when a terminal should:

send a measurement report to the 3GPP network 304;

connect to a WLAN network 302;

steer traffic over WLAN 302;

etc.

The thresholds and conditions could relate to one or more of several measurable parameters, such as received signal strength, received signal quality, load, etc. For instance, in one example implementation the thresholds and conditions can indicate to the terminal 300 that it should connect to a WLAN network 302 if the following conditions are fulfilled:

measured 3GPP reference signal received power (RSRP) <$Threshold_{RSRP}$, measured WLAN received signal strength indication (RSSI)>$Threshold_{RSSI}$, and WLAN Load<$Threshold_{WLANLoad}$.

An exemplary set of values for the thresholds are $Threshold_{RSRP}$=−105 dBm, $Threshold_{RSSI}$=−75 dBm and $Threshold_{WLANLoad}$=60%.

The thresholds could be adjusted by the 3GPP network 304 from time to time, in some embodiments of this approach, to control the terminal behaviour. If the 3GPP network 304 wants to avoid a terminal 300 connecting to WLAN 302, it could, for example, set the $Threshold_{RSRP}$ to a low value (or a lower value than previously), $Threshold_{RSSI}$ to a large (or a larger value than previously) value, and $Threshold_{WLANLoad}$ to a low value (or a lower value than previously). If the 3GPP network 304 wants to make a or multiple UEs 300 connect to WLAN 302, it can set the $Threshold_{RSRP}$ to a high value (or a higher value than previously), $Threshold_{RSSI}$ to a low value (or a lower value than previously), and $Threshold_{WLANLoad}$ to a large value (or a higher value than previously).

A threshold can be signalled as a bit string (i.e. a series of 0s and 1s) and where the different values of the bitstring can be mapped to a specific threshold. The table below illustrates how the mapping between the bitstring carrying the $Threshold_{RSRP}$ can be mapped to different threshold values for RSRP:

TABLE 1

Example bitstring to RSRP threshold mapping.

| Bitstring value | $Threshold_{RSRP}$ |
|---|---|
| 0000 | −120 dBm |
| 0001 | −115 dBm |
| 0010 | −110 dBm |
| . . . | . . . |

Thus, the network can control how a terminal 300 should handle a WLAN connection, e.g. when to connect to WLAN 302, by using thresholds and conditions.

A problem with this procedure is that it will cost unnecessary UE 300 power as the terminal 300 needs to perform the measurements and evaluations even in situations when the terminal 300 is not going to connect to WLAN 302. Performing measurements costs power in the terminal 300 which will reduce user experience as the terminal battery lifetime will be reduced. Therefore to save power it is necessary to allow the terminal 300 to refrain from performing WLAN measurements and evaluations. To enable this, an additional message needs to be introduced, which in turn will increase signalling load in the system.

Embodiments of the present invention therefore include methods allowing the 3GPP network 304 to control when a terminal 300 should perform certain actions with regards to WLAN 302 by using fields used for thresholds. In some cases, this may be done by setting aside (or reserving) one or more values for pre-existing fields in 3GPP messages to be used to indicate actions to be taken with respect to the WLAN 302. For example, a field for indicating a WLAN RSSI-threshold can be set by the 3GPP network 304 to its maximum value to indicate that the terminal 300 should refrain from connecting to a WLAN 302 (with the terminal 30 being configured to interpret the maximum value for this field as instructing the terminal 300 to refrain from connecting to the WLAN 302).

In this document it is described how one network is controlling how a terminal should handle an entity (e.g. a transceiver unit) capable of connecting to another network. Embodiments of the disclosed techniques and apparatus are described herein in the context of a 3GPP network 304 controlling a terminal's WLAN entity (e.g. a transceiver unit for communicating with a WLAN). However, it should be appreciated that the same techniques may be applied also to other types of networks. For instance, it could be that a WLAN network 302 is controlling a terminal's 3GPP entity (e.g. a transceiver unit for communicating with a 3GPP network), a WiMAX network is controlling a terminal's 3GPP connection, etc.

The term terminal is used in many places in this document for describing a device with capability to connect to wireless networks. However, it should be appreciated other terms can be used for the same thing. For example, according to the 3GPP specification the terminal is called user equipment (UE) and according to the WLAN specifications the term stations (STAs) is used for terminals.

As described above, the network may signal to the terminal a set of thresholds represented by a bitstring, where the different (reserved) values of the bitstring can be mapped to different thresholds (i.e. different reserved threshold values) that tell the terminal how it should handle a WLAN entity (e.g. a transceiver unit in the UE), such as under which conditions the terminal 300 should connect to WLAN 302, when it should send measurement reports, etc.

In some embodiments of the present invention a message is sent from the network 304 to the terminal 300 and contains a field used for signalling a threshold (i.e. a threshold value). One value (or set of values or condition(s)) of the field is reserved for indicating to the terminal 300 that the terminal 300 should perform a certain action. One benefit of this embodiment is that the network 304 can indicate to the terminal 300 that it should take a certain action without the need for introducing a specific message or field in a message for indicating this action. This allows for reduced signalling load, since no specific messages or fields in messages are required to be transmitted.

List 1, below, illustrates example actions that could be indicated to the terminal 300 according to these embodiments:

| List 1 |
| --- |
| Establishing a connection to WLAN (and possibly disconnecting the connection to 3GPP) |
| Refrain from establishing a connection to WLAN (and possibly maintain the connection to 3GPP). |
| Connect to WLAN. |
| Disconnect from WLAN. |
| Send measurement reports regarding WLAN to the network. |
| Refrain from sending measurement reports regarding WLAN to the network. |
| Steer traffic to WLAN. |
| Refrain from steering traffic to WLAN. |
| Move some or all traffic from a 3GPP RAT to WLAN. |
| Move some or all traffic from WLAN to a 3GPP RAT. |
| Turn on the WLAN entity (e.g. a transceiver unit) |
| Refrain from turning the WLAN entity (e.g. a transceiver unit) on. |
| Turn off the WLAN entity (e.g. a transceiver unit). |
| Take the WLAN entity out of a power saving state/mode |
| Put the WLAN entity (e.g. a transceiver unit) in a power saving state/mode. |

Note: Some of these actions may share the same (reserved) bitstring value, which can be interpreted differently, depending on the terminal's state. For example, "Refrain from establishing a connection to WLAN" and "Disconnect from WLAN" might share the same bitstring value, in some embodiments. The terminal 300 would, when receiving this indication, disconnect from WLAN 302 if the terminal 300 is connected to WLAN 302. If the terminal 300 is not connected to WLAN 302 when it receives this indication, it would refrain from connecting to WLAN 302.

In one alternative of this embodiment the indication does not mean that the terminal 300 has to perform the indicated action. Instead it means that the terminal 300 is allowed to perform the appropriate action(s) in List 1 (or other actions indicated by the message), if deemed suitable by other controlling mechanisms. For example, the terminal 300 may require the WLAN entity to be turned on to perform WLAN measurements on a private-WLAN (i.e. a WLAN not associated with the 3GPP network operator) and the network 304 may not be aware of this. Hence the network 304 should not prohibit that the terminal 300 keeps the WLAN entity (e.g. a transceiver unit) turned on but rather allow for the terminal 300 to turn off WLAN and the terminal 300 may do so if other controlling mechanisms also deem it suitable.

Regarding the meaning of being connected to WLAN, it can, for example, mean any one or more of the following:

- 802.11 authentication (Authentication to the WLAN AP)
- 802.1x EAP-SIM authentication (Authentication to the AAA-servers)
- Four way hand-shake between the terminal and the WLAN network is completed
- Getting an IP address assigned in WLAN
- A PDN connection is established through the WLAN network, i.e. a connection between the terminal and the PDN gateway.
- Data traffic has been started through the WLAN network.

The network 304 may signal to the terminal 300 more than one field used for signalling thresholds. In an alternative embodiment, the terminal 300 is configured such that it should consider more than one field when determining whether it has received an indication to perform one of the actions listed in List 1. The terminal 300 could, for example, be configured such that only if both the $Threshold_{RSRP}$ and the $Threshold_{RSSI}$ are set to certain reserved values the terminal 300 considers the indication to be received. Another example configuration of the terminal 300 is that if either of the $Threshold_{RSRP}$ or the $Threshold_{RSSI}$ are set to certain reserved values, then the terminal 300 considers the indication to be received.

In one specific implementation of this invention, a reserved bitstring value is mapped to a value that is not possible to achieve (i.e. a value that will not occur in a practical implementation of the terminal/network). As the value is not possible to achieve, the terminal 300 may take appropriate actions upon receiving this value. For example, if the network 304 has indicated to the terminal 300 that it should connect to a WLAN network 302 if the 3GPP RSRP is equal to or above positive infinity, then it is clear that the terminal 300 would never connect to WLAN 302, since the RSRP cannot reach positive infinity. The terminal 300 may then be configured to turn off WLAN (or take any of the other actions listed in List 1), given such a threshold. Examples of such threshold values which cannot be achieved (or are unrealistic in practice) are given below:

- $Threshold_{RSRP}$ of positive infinity
- $Threshold_{RSSI}$ of positive infinity
- $Threshold_{WLANLoad}$ of 101%
- $Threshold_{RSSI}$ of +10 dBm

Example Implementation and Procedures

Examples of possible mappings of a bitstring to thresholds are given below, in Tables 2, 3, and 4:

TABLE 2

Example bitstring to RSRP threshold mapping.

| Bitstring value | Threshold$_{RSRP}$ |
|---|---|
| 0000 | −120 dBm |
| 0001 | −115 dBm |
| 0010 | −110 dBm |
| 0011 | −105 dBm |
| 0100 | −100 dBm |
| . . . | . . . |
| 1110 | −50 dBm |
| 1111 | Disconnect from WLAN |

TABLE 3

Example bitstring to RSSI threshold mapping.

| Bitstring value | Threshold$_{RSSI}$ |
|---|---|
| 0000 | −120 dBm |
| 0001 | −115 dBm |
| 0010 | −110 dBm |
| . . . | . . . |
| 1110 | −50 dBm |
| 1111 | Disconnect from WLAN |

TABLE 4

Example bitstring to WLAN load mapping.

| Bitstring value | Threshold$_{WLANLoad}$ |
|---|---|
| 000 | 14 |
| 001 | 28 |
| 010 | 42 |
| 011 | 57 |
| 100 | 71 |
| 101 | 88 |
| 110 | 100 |
| 111 | Disconnect from WLAN |

It will be appreciated that the example bitstrings for the three parameters can be communicated to the terminal 300 using respective message fields, or they can be combined into a single bitstring and included in a single (suitably large) message field.

Figure 13:
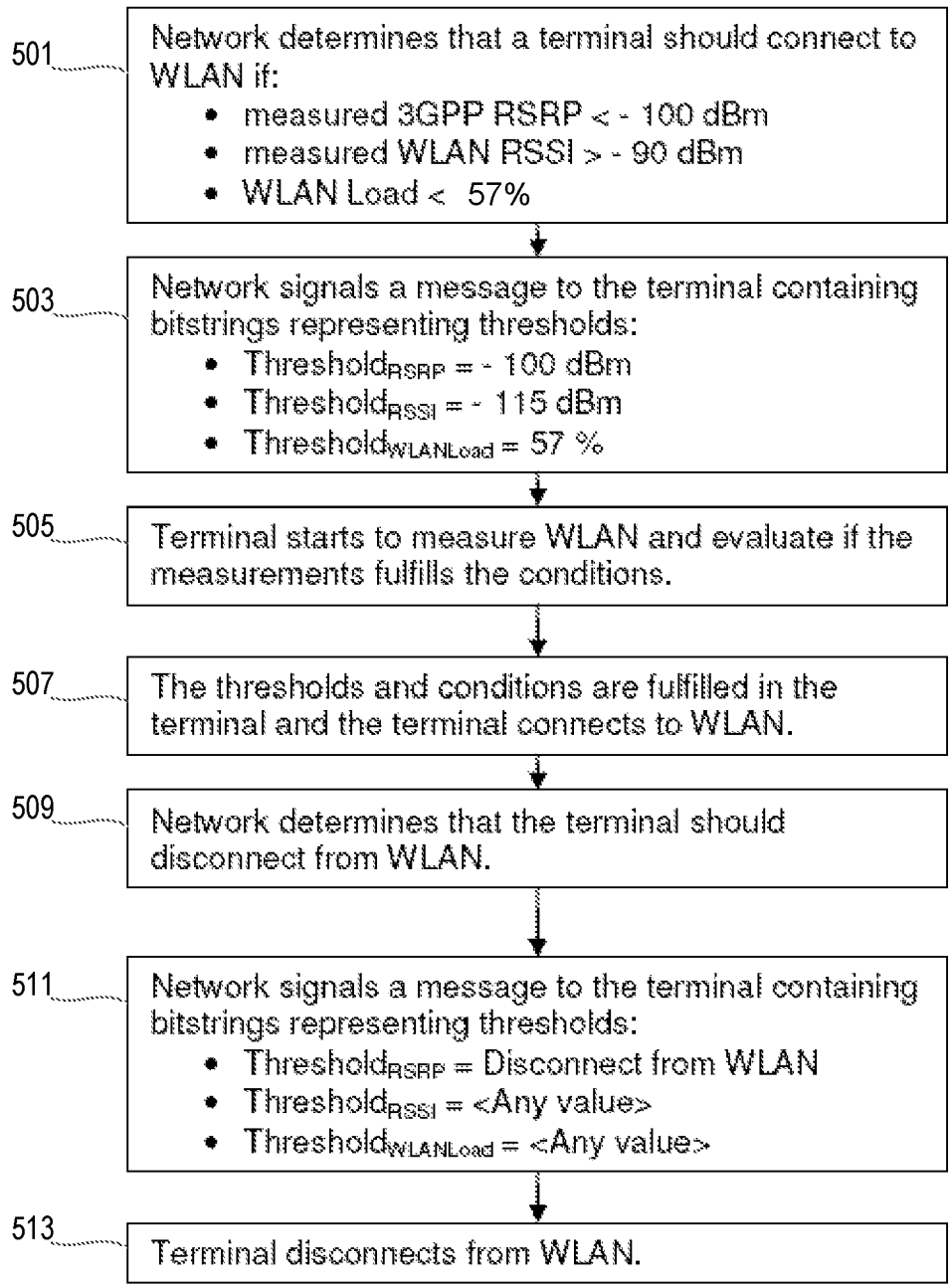
FIG. 13 is a process flow diagram illustrating a method in a network and a mobile terminal according to an embodiment.

Example Event Flow:

In the example implementation illustrated in the process flow diagram of FIG. 13, at least one of Threshold$_{RSRP}$, Threshold$_{RSSI}$ and Threshold$_{WLANLoad}$ is required to be set to "Disconnect from WLAN" for the terminal 300 to consider that it has been indicated that it should disconnect from WLAN 302. In alternative implementations, the terminal could consider that it has been indicated that it should disconnect from WLAN 302 if all or multiple ones of the thresholds are set to the appropriate reserved values. It will be appreciated that different actions can be indicated by different ones of the thresholds being set to a reserved value.

It will be appreciated that the process flow diagram of FIG. 13 illustrates the steps performed in the system, and thus includes steps that are performed in the network and in the mobile terminal 300.

In this example implementation, the mobile terminal is configured to connect to a WLAN 302 if certain thresholds and/or conditions are met. The thresholds and/or conditions are:

measured 3GPP RSRP<threshold$_{RSRP}$
measured WLAN RSSI>threshold$_{RSSI}$; and
WLAN Load<threshold$_{WLANLoad}$ In a first step, step 501, the 3GPP network 304 determines the thresholds to be used by the mobile terminal 300 to determine whether to connect to the WLAN 302. In this example, the thresholds and/or conditions to be met in order for the mobile terminal 300 to connect to the WLAN 302 are:

measured 3GPP RSRP<−100 dBm
measured WLAN RSSI>−90 dBm
WLAN Load<57%

(so threshold$_{RSRP}$=−100 dBm; threshold$_{RSSI}$=−90 dBm; and threshold$_{WLANLoad}$=57%).

In a second step, step 503, the network 304 signals the thresholds and/or conditions to the mobile terminal 300 using one or message fields used to signal threshold values to the mobile terminal 300. The network thus signals bitstrings to the mobile terminal 300 with each bitstring representing a respective one of the threshold values.

In step 505, the mobile terminal 300 receives the threshold values and/or conditions, starts to measure the relevant parameters of the 3GPP network 304 (e.g. reference signal received quality (RSRQ), received signal code power (RSCP) and/or RSRP) and the WLAN 302 (i.e. RSSI and load) and determine whether the thresholds and/or conditions are met.

If or once the thresholds and/or conditions are met, the mobile terminal 300 connects to the WLAN 302 (step 507).

If the network 304 subsequently decides that the mobile terminal 300 should disconnect from the WLAN 302 (step 509), the network sends another message to the mobile terminal 300 containing an appropriate value for one or more of the thresholds and/or conditions that is interpreted by the mobile terminal 300 as an instruction from the network 304 to disconnect from the WLAN 302.

The network 304 can therefore signal this action to the mobile terminal 300 using an appropriate threshold value that has been reserved by the network 304 and mobile terminal 300 for this purpose (step 511). An exemplary set of threshold values and/or conditions that can be signalled to the mobile terminal 300 are set out below Threshold$_{RSRP}$=<the value that represents: Disconnect from WLAN>
Threshold$_{RSSI}$=<Any value>
Threshold$_{WLANLoad}$=<Any value>

On receipt of this message, the mobile terminal 300 reads the threshold value(s) and/or conditions from the message, interprets the value for the Threshold$_{RSRP}$ as instructing the mobile terminal 300 to disconnect from the WLAN 302 and then disconnects from the WLAN 302 (step 513).

Figure 14:
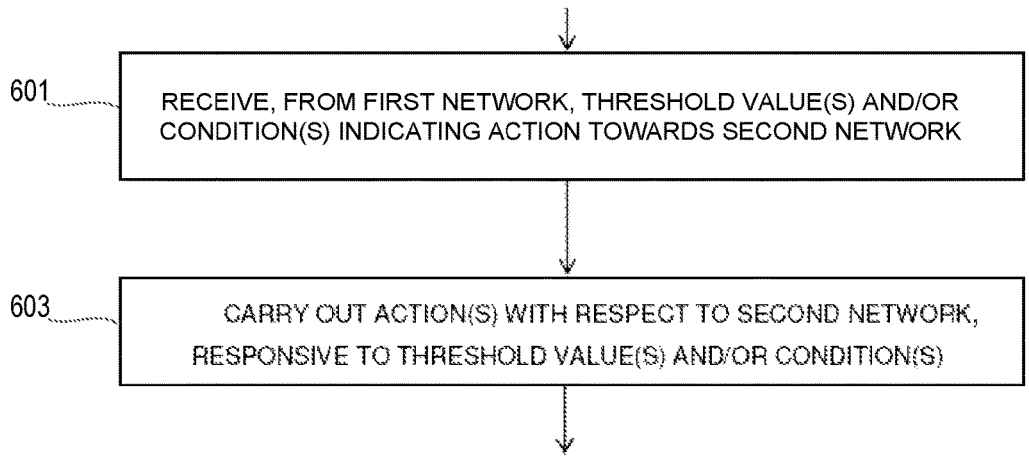
FIG. 14 is a process flow diagram of a method of operating a mobile terminal according to an embodiment.

FIG. 14 is a process flow diagram illustrating a method, in a mobile terminal 300, for handling connections to two radio access technologies. It will be appreciated that the illustrated method is a generalization of the techniques detailed above.

As shown at block 601, the method begins with receiving, from a first radio access network (e.g. a network operating according to a first radio access technology, RAT), one or more threshold values and/or conditions for use in determining how the mobile terminal 300 should handle connections to the second radio access network (e.g. a network operating according to a second, possibly different, RAT), where the one or more threshold values and/or conditions are received in a message field that is otherwise used to carry threshold values for regulating the behaviour of the mobile terminal 300. At least one of the possible threshold values and/or conditions correspond to a reserved value and/or condition that is used to indicate an action for the mobile terminal to take with respect to the second radio access network.

In some embodiments, the message field is otherwise used to carry threshold values for regulating the behaviour of the mobile terminal 300 with respect to the first radio access network.

As noted above, one or more values for this field are reserved to indicate that the mobile terminal 300 should take some action with respect to the second radio access network. This indication may be implicit, such as through the use of an impossible threshold value (i.e. a value that will not realistically occur in a practical implementation of the terminal/network), or explicit, in that a particular value is set aside by the first radio access network for the express purpose of indicating the action. The mobile terminal 300 will be configured or arranged to interpret the reserved threshold value(s) and/or conditions as specifying the specific action(s) to take with respect to the second radio access network. In particular, the mobile terminal will be configured to determine whether any received threshold values and/or conditions correspond to a value and/or condition reserved for indicating an action for the mobile terminal to take with respect to the second radio access network, and if so the mobile terminal will be configured to carry out the action indicated by the reserved value and/or condition.

In some embodiments, this field is a pre-existing field in a pre-existing message sent by the first radio access network. As shown at block 603, the method continues with carrying out one or more actions with respect to the second radio access network, based on the received one or more threshold values and/or conditions.

As discussed above, e.g., in connection with List 1, the one or more actions carried out by the mobile terminal 300 may include any one or more of the following:
- establishing or refraining from establishing a connection to the second radio access network;
- connecting to or disconnecting from the second radio access network;
- sending or refraining from sending measurement reports regarding the second radio access network to the first radio access network;
- steering or refraining from the steering of traffic to the second radio access network;
- moving some or all traffic from the second radio access network to the first radio access network (or vice versa);
- turning on or refraining from turning on mobile terminal access functionality (i.e. a transceiver unit) for radio access technology of the type supported by the second radio access network;
- turning on or turning off mobile terminal access functionality (i.e. a transceiver unit) for radio access technology of the type supported by the second radio access network; and
- putting mobile access functionality (i.e. a transceiver unit) for radio access technology of the type supported by the second radio access network into or out of a power saving state or mode.

In some embodiments, the one or more actions carried out are further based on a state of the mobile terminal 300 with respect to the second radio access network, such that different states can result in different actions, given the same threshold values and/or conditions. For instance, in some embodiments carrying out the one or more actions may comprise, in response to a particular threshold value, disconnecting from the second radio access network if already connected to the second radio access network and otherwise (i.e. if not already connected to the second radio access network) refraining from connecting to the second radio access network.

In some embodiments, the received threshold value or condition indicates an impossible threshold or condition (i.e. a value that will not realistically occur in a practical implementation of the terminal/network), and the mobile terminal carries out the one or more actions in response to determining that the received threshold value or condition indicates an impossible threshold or condition. In these and in other embodiments, the carrying out of the one or more actions may be further conditioned on one or more other controlling mechanisms applicable to the mobile terminal 300.

In some embodiments, the first radio access network is a cellular telecommunications network, such as a 3GPP LTE network, and the second radio access network is a wireless local area network, such as an IEEE 802.11 wireless network.

Figure 15:
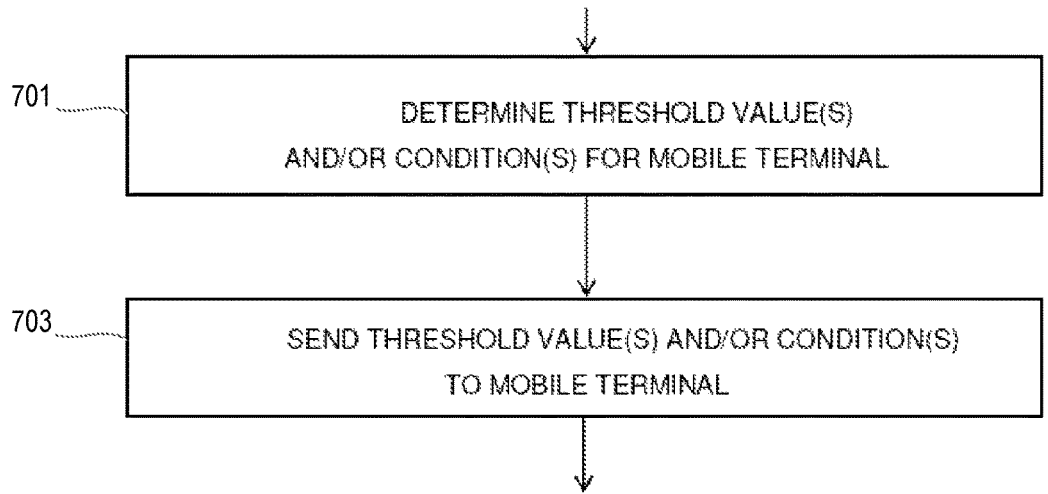
FIG. 15 is a process flow diagram of a method of operating a network node according to an embodiment.

FIG. 15 is a process flow diagram illustrating a corresponding method, implemented in a network node, for example a base station (e.g. an eNB), of a first radio access network (e.g. a network operating according to a first RAT). The illustrated method begins, as shown at block 701, with determining, for a mobile terminal 300, one or more threshold values and/or conditions for use in determining how the mobile terminal 300 should handle connections to a second radio access network (e.g. a network operating according to a second, possibly different, RAT). The one or more threshold values and/or conditions are then sent to the mobile terminal 300, as shown at block 703. At least one of the possible threshold values and/or conditions correspond to a reserved value and/or condition that is used to indicate an action for the mobile terminal to take with respect to the second radio access network. These threshold values and/or conditions are sent in a message field that is otherwise used to carry threshold values for regulating the behaviour of the mobile terminal 300.

In some embodiments, one or more values for this field are reserved by the first radio access network to indicate that the mobile terminal 300 should take some action with respect to the second radio access network. This indication may be implicit, such as through the use of impossible threshold value (i.e. a value that will not realistically occur in a practical implementation of the terminal/network), or explicit, in that a particular value is set aside for the express purpose of indicating the action. In some embodiments, this field is a pre-existing field in a pre-existing message sent by the first radio access network.

In some embodiments, step 701 can comprise determining how the mobile terminal 300 should handle connections to the second radio access network (i.e. determining a specific action or actions for the mobile terminal 300 to take with respect to the second radio access network), and then determining the appropriate one or more reserved threshold values and/or conditions for the specific action or actions that are to be transmitted to the mobile terminal 300.

In some embodiments, the one or more (reserved) threshold values and/or conditions indicate respective one or more actions to be taken by the mobile terminal 300 with respect to the second wireless (radio) access network, the one or more actions including one or more of the following:

establishing or refraining from establishing a connection to the second radio access network;

connecting to or disconnecting from the second radio access network;

sending or refraining from sending measurement reports regarding the second radio access network to the first radio access network;

steering or refraining from the steering of traffic to the second radio access network;

moving some or all traffic from the second radio access network to the first radio access network (or vice versa);

turning on or refraining from turning on mobile terminal access functionality (i.e. a transceiver unit) for radio access technology of the type supported by the second radio access network;

turning on or turning off mobile terminal access functionality (i.e. a transceiver unit) for radio access technology of the type supported by the second radio access network; and putting mobile access functionality (i.e. a transceiver unit) for radio access technology of the type supported by the second radio access network into (or out of) a power saving state or mode.

In some embodiments, determining one or more reserved threshold values and/or conditions comprises determining an impossible threshold value or condition. As was the case for the process flow diagram of FIG. 14, in some embodiments the first radio access network is a cellular telecommunications network, such as a 3GPP LTE network, and the second radio access network is a wireless local area network, such as an IEEE 802.11 wireless network.

Hardware Implementations

Figure 16:
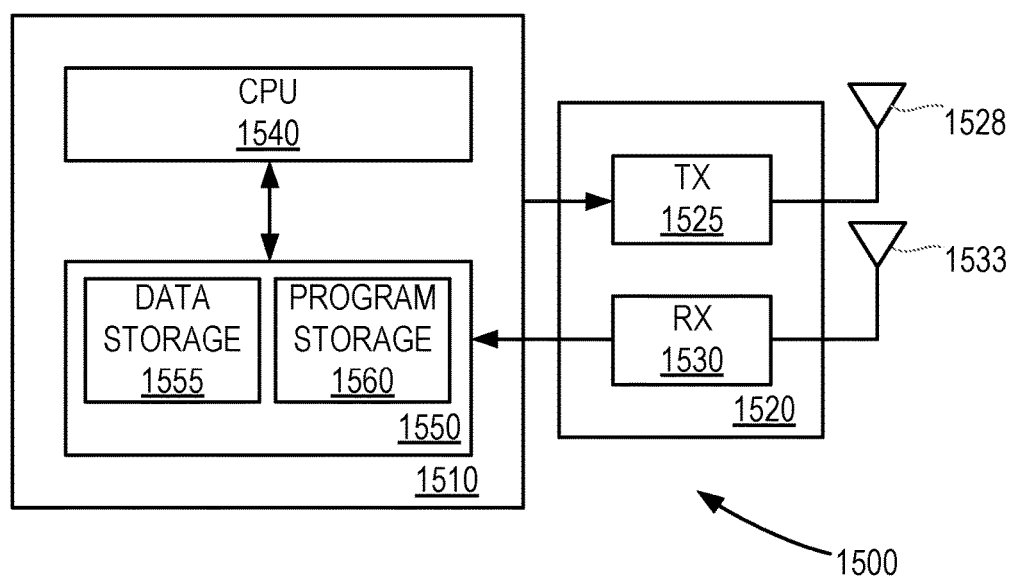
FIG. 16 is a block diagram of a mobile terminal according to an embodiment.

Several of the techniques and methods described above may be implemented using radio circuitry and electronic data processing circuitry provided in a terminal. FIG. 16 illustrates features of an example terminal 1500 according to several embodiments of the present invention. Terminal 1500, which may be a UE configured for operation with an LTE network (E-UTRAN) and that also supports Wi-Fi, for example, comprises a transceiver unit 1520 for communicating with one or more base stations as well as a processing circuit 1510 for processing the signals transmitted and received by the transceiver unit 1520. Transceiver unit 1520 includes a transmitter 1525 coupled to one or more transmit antennas 1528 and receiver 1530 coupled to one or more receiver antennas 1533. The same antenna(s) 1528 and 1533 may be used for both transmission and reception. Receiver 1530 and transmitter 1525 use known radio processing and signal processing components and techniques, typically according to a particular telecommunications standard such as the 3GPP standards for LTE. Note also that transmitter unit 1520 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 1510 comprises one or more processors 1540 coupled to one or more memory devices 1550 that make up a data storage memory 1555 and a program storage memory 1560. Processor 1540, identified as CPU 1540 in FIG. 16, may be a microprocessor, microcontroller, or digital signal processor, in some embodiments. More generally, processing circuit 1510 may comprise a processor/firmware combination, or specialized digital hardware, or a combination thereof. Memory 1550 may comprise one or several types of memory such as read-only memory (ROM), random-access memory, cache memory, flash memory devices, optical storage devices, etc. Because terminal 1500 supports multiple radio access networks, processing circuit 1510 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 1510 include modulation and coding of transmitted signals and the demodulation and decoding of received signals. In several embodiments of the present invention, processing circuit 1510 is adapted, using suitable program code stored in program storage memory 1560, for example, to carry out one of the techniques described above for access network selection. Of course, it will be appreciated that not all of the steps of these techniques are necessarily performed in a single microprocessor or even in a single module.

Figure 17:
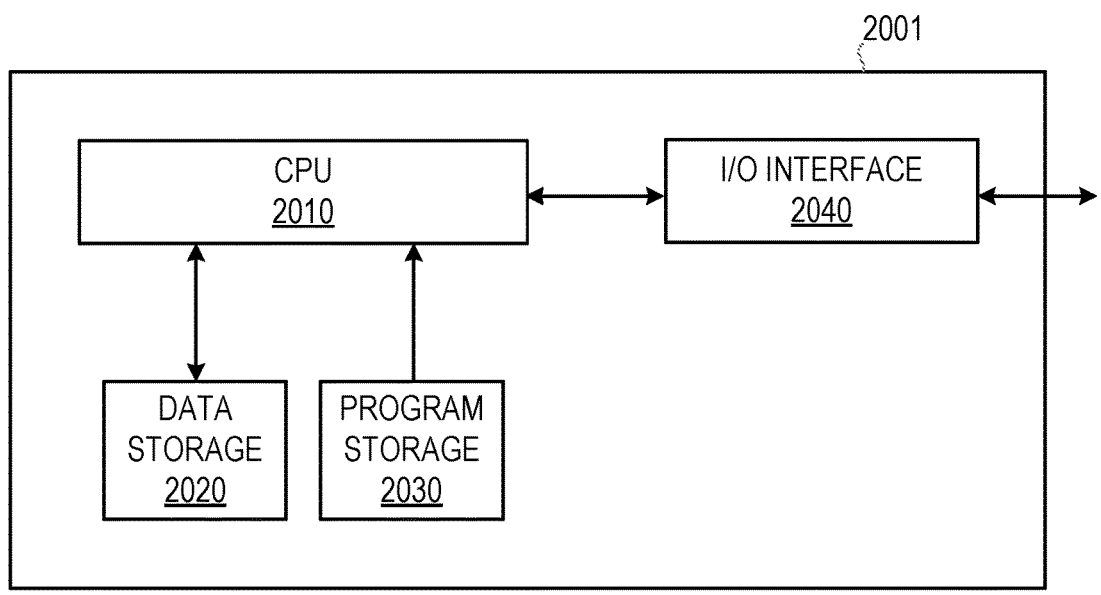
FIG. 17 is a block diagram of a network node according to an embodiment.

Similarly, several of the techniques and processes described above can be implemented in a network node, such as an eNodeB or other node in a 3GPP network. FIG. 17 is a schematic illustration of a node 2001 in which a method embodying any of the presently described network-based techniques can be implemented. A computer program for controlling the node 2001 to carry out a method embodying the present invention is stored in a program storage 2030, which comprises one or several memory devices. Data used during the performance of a method embodying the present invention is stored in a data storage 2020, which also comprises one or more memory devices. During performance of a method embodying the present invention, program steps are fetched from the program storage 2030 and executed by a Central Processing Unit (CPU) 2010, retrieving data as required from the data storage 2020. Output information resulting from performance of a method embodying the present invention can be stored back in the data storage 2020, or sent to an Input/Output (I/O) interface 2040, which includes a network interface for sending and receiving data to and from other network nodes and which may also include a radio transceiver for communicating with one or more terminals.

Accordingly, in various embodiments of the invention, processing circuits, such as the CPU 2010 in FIG. 17, are configured to carry out one or more of the techniques described in detail above. Likewise, other embodiments include radio network controllers including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

According to the techniques disclosed herein, a network can indicate to the terminal how it should handle the WLAN entity (i.e. transceiver unit) or connections to the WLAN. In some cases, this can be done without the need for signalling additional fields to the terminal. Instead, already existing fields are used. This allows for reduced signalling load.

It will be appreciated by the person of skill in the art that various modifications may be made to the above described embodiments without departing from the scope of the present invention. For example, although embodiments of the present invention have been described with examples that include a communication system compliant to the 3GPP specified LTE standard specification, it should be noted that the solutions presented may be equally well applicable to any other 3GPP specified technology in combination with 802.11 specifications. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

The invention claimed is:

1. A method, in a terminal, for handling connections to two radio access networks, the method comprising:
   receiving, from a first radio access network, in a message field used to carry threshold values for use in determining how the terminal should handle connections to a second radio access network, a reserved value that indicates at least one action for the terminal to take with respect to the second radio access network; and
   carrying out one or more actions with respect to the second radio access network, in response to receiving the reserved value in the message field, without applying the reserved value as a threshold value.

2. The method of claim 1, wherein the one or more actions comprise one or more of the following:
   establishing or refraining from establishing a connection to the second radio access network;
   connecting to or disconnecting from the second radio access network;
   sending or refraining from sending measurement reports regarding the second radio access network to the first radio access network;
   steering or refraining from the steering of traffic to the second radio access network;
   moving some or all traffic from the second radio access network to the first radio access network or vice versa;
   turning on or refraining from turning on terminal access functionality for radio access technology of the type supported by the second radio access network;
   turning on or turning off terminal access functionality for radio access technology of the type supported by the second radio access network;
   putting mobile access functionality for radio access technology of the type supported by the second radio access network into or out of a power saving state or mode.

3. The method of claim 1, wherein the one or more actions carried out are further based on a state of the terminal with respect to the second radio access network, such that different states can result in different actions, given the same reserved value.

4. The method of claim 1, further comprising determining that the reserved value indicates an impossible threshold and/or condition, wherein said carrying out of the one or more actions is responsive to said determining.

5. The method of claim 1, wherein said carrying out one or more actions is further conditioned on one or more other controlling mechanisms applicable to the terminal.

6. The method of claim 1, wherein the first radio access network is a cellular telecommunications network and the second radio access network is a wireless local area network.

7. A method, in a network node of a first radio access network, for managing connections of a terminal to a second radio access network, the method comprising:
   determining, for the terminal, that the terminal should take at least one specific action with respect to the second radio access network; and
   sending, in a message field used to carry threshold values for use in determining how the terminal should handle connections to a second radio access network, a reserved value that indicates the at least one specific action for the terminal to take, with respect to the second radio access network, wherein the reserved value is sent in the message field instead of a threshold value.

8. The method of claim 7, wherein the at least one specific action comprises one or more of the following:
   establishing or refraining from establishing a connection to the second radio access network;
   connecting to or disconnecting from the second radio access network;
   sending or refraining from sending measurement reports regarding the second radio access network to the first radio access network;
   steering or refraining from the steering of traffic to the second radio access network;
   moving some or all traffic from the second radio access network to the first radio access network, or vice versa;
   turning on or refraining from turning on terminal access functionality for radio access technology of the type supported by the second radio access network;
   turning on or turning off terminal access functionality for radio access technology of the type supported by the second radio access network;
   putting mobile access functionality for radio access technology of the type supported by the second radio access network into or out of a power saving state or mode.

9. The method of claim 7, the reserved value indicates an impossible threshold value and/or condition, thereby indicating that the terminal is to take the at least one specific action.

10. The method of claim 7, wherein the first radio access network is a cellular telecommunications network and the second radio access network is a wireless local area network.

11. A terminal apparatus comprising:
    radio circuitry configured to handle connections to two radio access networks; and
    a processing circuit configured to:
    receive, from a first radio access network, in a message field used to carry threshold values for use in determining how the terminal should handle connections to a second radio access network, a reserved value that indicates an action for the terminal to take with respect to the second radio access network;
    carry out one or more actions with respect to the second radio access network, in response to receiving the reserved value in the message field, without applying the reserved value as a threshold value.

12. A network node adapted for use in a first radio access network, for managing connections of a terminal to a second radio access network, the network node comprising a processing circuit configured to:

determine, for the terminal, that the terminal should take at least one specific action with respect to the second radio access network; and send, in a message field used to carry threshold values for use in determining how the terminal should handle connections to a second radio access network, a reserved value that indicates the at least one specific action for the terminal to take, with respect to the second radio access network, wherein the reserved value is sent in the message field instead of a threshold value.

13. The network node of claim 12, wherein the network node is a base station apparatus and the base station apparatus further comprises radio circuitry configured to handle connections to one or more mobile terminals according to the first radio access technology.

* * * * *